(12) United States Patent
Nishimura

(10) Patent No.: US 11,614,822 B2
(45) Date of Patent: Mar. 28, 2023

(54) IMAGING DEVICE

(71) Applicant: MAXELL, LTD., Kyoto (JP)

(72) Inventor: Ryuji Nishimura, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/555,288

(22) Filed: Dec. 17, 2021

(65) Prior Publication Data
US 2022/0113828 A1    Apr. 14, 2022

Related U.S. Application Data

(63) Continuation of application No. 16/072,498, filed as application No. PCT/JP2017/000664 on Jan. 11, 2017, now Pat. No. 11,221,707.

(30) Foreign Application Priority Data

Jan. 28, 2016 (JP) .................................. 2016-014533
May 27, 2016 (JP) .................................. 2016-105800

(51) Int. Cl.
*G06F 3/041* (2006.01)
*H04N 5/232* (2006.01)
(Continued)

(52) U.S. Cl.
CPC ........... *G06F 3/0416* (2013.01); *G03B 13/36* (2013.01); *G03B 17/02* (2013.01); *G06F 3/0412* (2013.01);
(Continued)

(58) Field of Classification Search
CPC ..... G06F 3/0416; G06F 3/0412; G03B 13/36; G03B 17/02; G03B 17/18; H04N 5/2254;
(Continued)

(56) References Cited

U.S. PATENT DOCUMENTS

2007/0018069 A1   1/2007  Higashino
2007/0086764 A1   4/2007  Konicek
(Continued)

FOREIGN PATENT DOCUMENTS

CN        103731595 A     4/2014
JP      2004-064205 A     2/2004
(Continued)

OTHER PUBLICATIONS

Reasons for Refusal issued in correspondingg Japanese Patent Application No. 2019-193201, dated Sep. 1, 2020, with English translation.
(Continued)

*Primary Examiner* — Sinh Tran
*Assistant Examiner* — Zhenzhen Wu
(74) *Attorney, Agent, or Firm* — McDermott Will & Emery LLP

(57) ABSTRACT

Provided is an imaging device that includes a rear display and an electronic viewfinder and is excellent in operability to a touch panel when an electronic viewfinder is used. When a user performs a touch manipulation on a touch panel installed in a rear display in order to set a focus area, an effective detection area for detecting a touch position is different between when the rear display is used and when the electronic viewfinder is used. When the rear display is used, the effective detection area is set to coincide with the entire display screen, and when the electronic viewfinder is used, the effective detection area is set to be reduced to an area of a part of the display screen of the rear display.

18 Claims, 17 Drawing Sheets

(51) Int. Cl.
   *G03B 17/02* (2021.01)
   *G03B 13/36* (2021.01)
   *H04N 5/225* (2006.01)
   *G03B 17/18* (2021.01)

(52) U.S. Cl.
   CPC ....... *H04N 5/2254* (2013.01); *H04N 5/23212* (2013.01); *H04N 5/23216* (2013.01); *H04N 5/23293* (2013.01); *H04N 5/232127* (2018.08); *H04N 5/232933* (2018.08); *H04N 5/232945* (2018.08); *G03B 17/18* (2013.01)

(58) Field of Classification Search
   CPC ........ H04N 5/23212; H04N 5/232127; H04N 5/23216; H04N 5/23293; H04N 5/232933; H04N 5/232945; H04N 5/22525; H04N 5/2253
   See application file for complete search history.

(56) References Cited

U.S. PATENT DOCUMENTS

| | | | |
|---|---|---|---|
| 2008/0231740 A1 | 9/2008 | McIntyre et al. | |
| 2010/0045825 A1* | 2/2010 | Hatori | G02B 13/0055 348/241 |
| 2011/0310285 A1 | 12/2011 | Nakai | |
| 2013/0083222 A1* | 4/2013 | Matsuzawa | H04N 5/232935 348/222.1 |
| 2013/0083228 A1 | 4/2013 | Iwatani | |
| 2014/0049677 A1 | 2/2014 | Kawaguchi | |
| 2014/0049678 A1 | 2/2014 | Tanaka | |
| 2014/0098273 A1 | 4/2014 | Ito et al. | |
| 2014/0176775 A1 | 6/2014 | Ichikawa et al. | |
| 2014/0184867 A1 | 7/2014 | Sudo | |
| 2014/0293086 A1 | 10/2014 | Ugawa | |
| 2015/0244940 A1 | 8/2015 | Lombardi et al. | |
| 2015/0334290 A1* | 11/2015 | Akaho | G06F 3/04886 348/333.12 |
| 2019/0191101 A1 | 6/2019 | Ogawa | |
| 2020/0068137 A1 | 2/2020 | von Fintel et al. | |

FOREIGN PATENT DOCUMENTS

| | | | |
|---|---|---|---|
| JP | 2006-098676 A | | 4/2006 |
| JP | 2007-019685 A | | 1/2007 |
| JP | 2009-086601 A | | 4/2009 |
| JP | 2012-089973 A | | 5/2012 |
| JP | 2012089973 A | * | 5/2012 |
| JP | 2012-191570 A | | 10/2012 |
| JP | 2012-203352 A | | 10/2012 |
| JP | 2014126796 A | | 7/2014 |
| JP | 2015-181239 A | | 10/2015 |
| WO | 2012/001749 A1 | | 1/2012 |

OTHER PUBLICATIONS

Non-Final Office Action issued in U.S. Appl. No. 16/072,498, dated Aug. 23, 2019.
Final Office Action issued in U.S. Appl. No. 16/072,498, dated Jun. 1, 2020.
Non-Final Office Action issued in U.S. Appl. No. 16/072,498, dated Jan. 26, 2021.
Notice of Allowance issued in U.S. Appl. No. 16/072,498, dated Aug. 25, 2021.
Notice of Reasons for Refusal issued for the corresponding Japanese Patent Application No. 2021-076511, dated Apr. 12, 2022, with English translation.
Chinese Office Action issued in corresponding Chinese Patent Application No. 2017-80007886.4, dated Dec. 11, 2019, with English translation.
Search Report issued in corresponding International Patent Application No. PCT/JP2017/000664, dated Mar. 21, 2017.

* cited by examiner

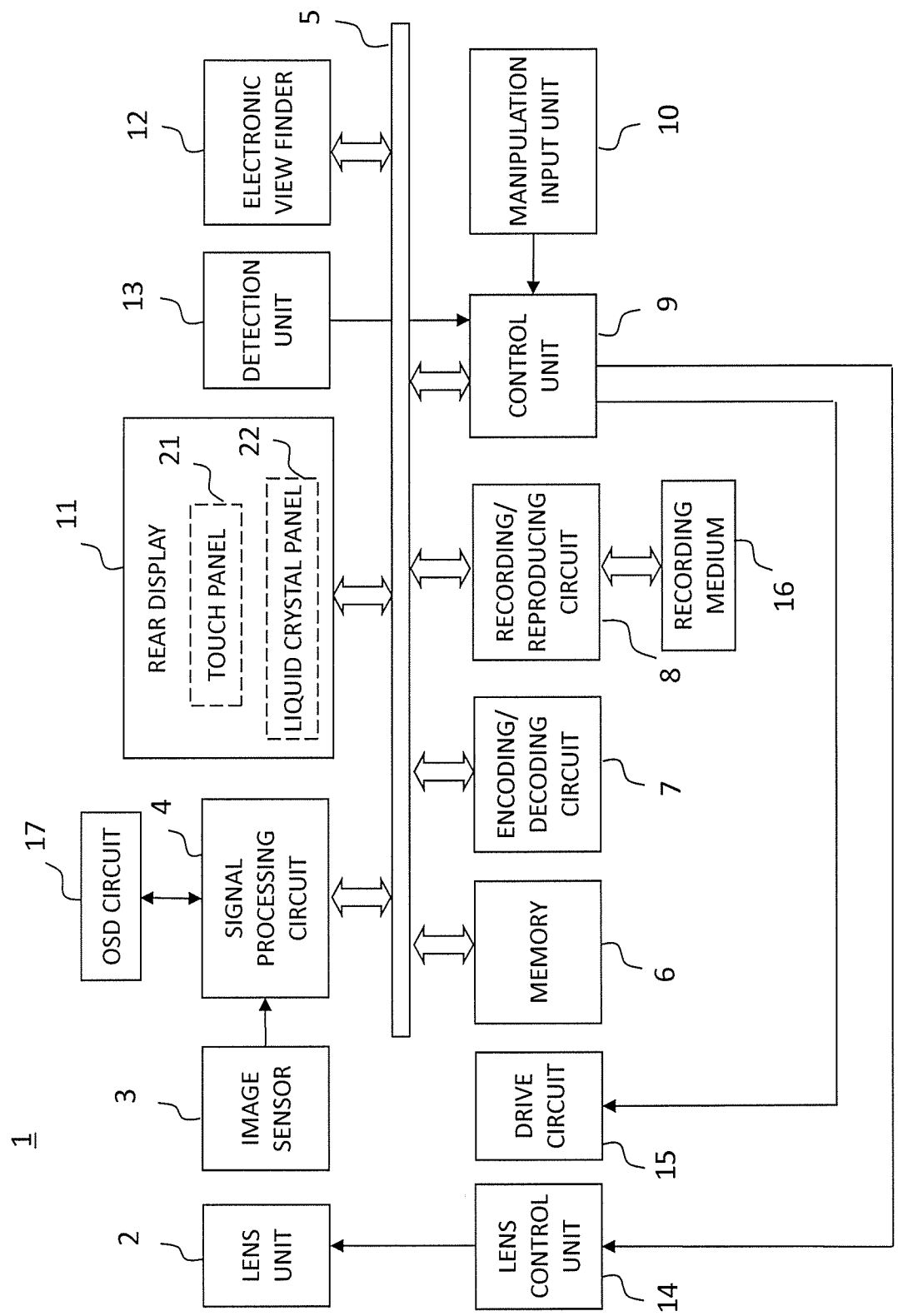

FIG. 2
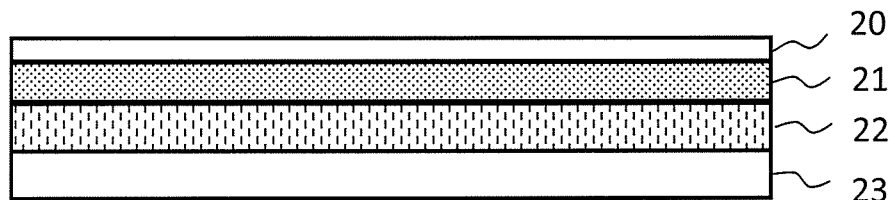
FIG. 3
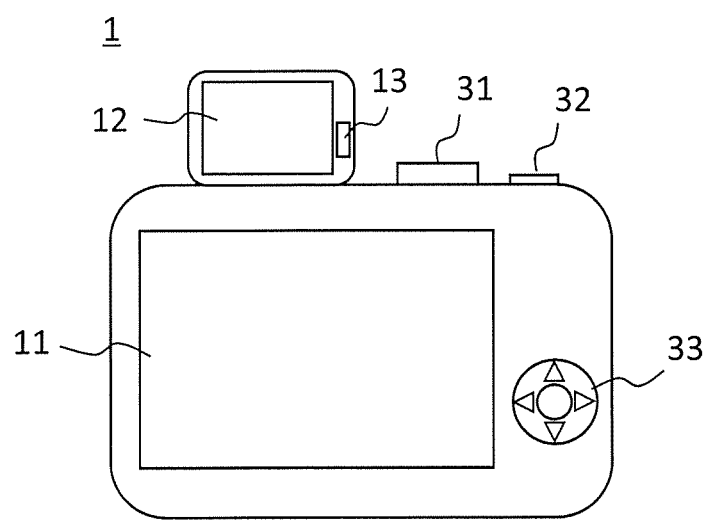
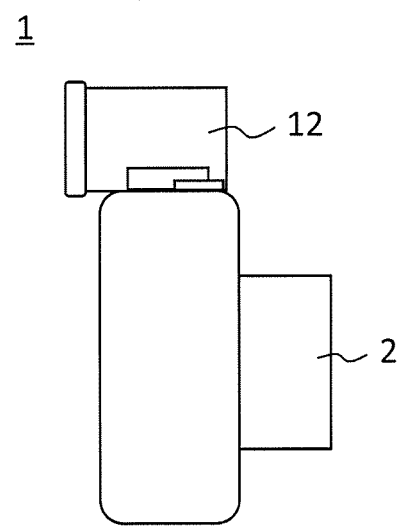

FIG. 9
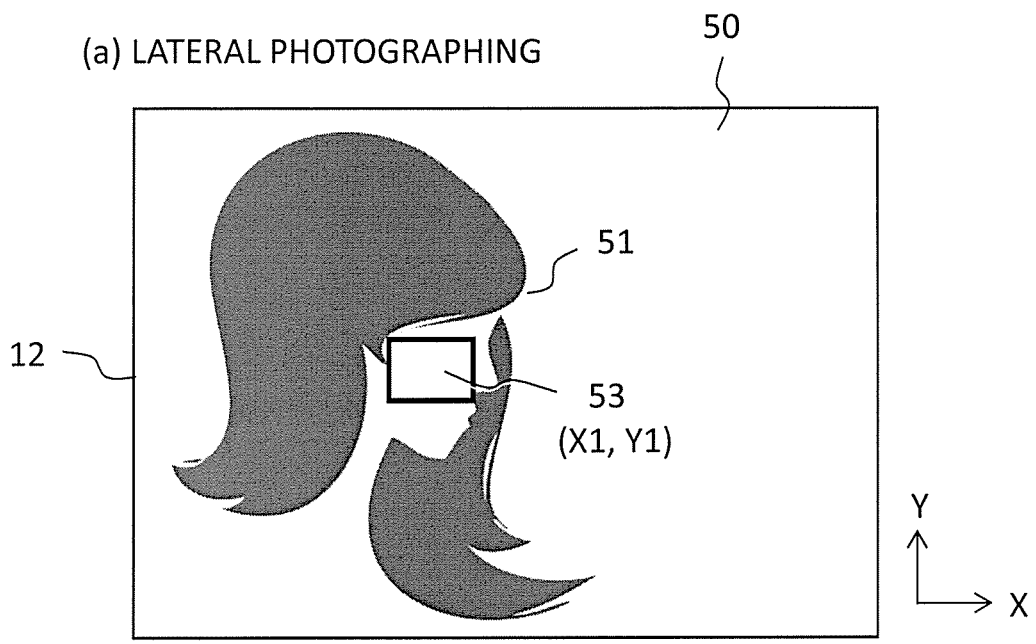
(a) LATERAL PHOTOGRAPHING
COUNTERCLOCKWISE ROTATION BY 90°
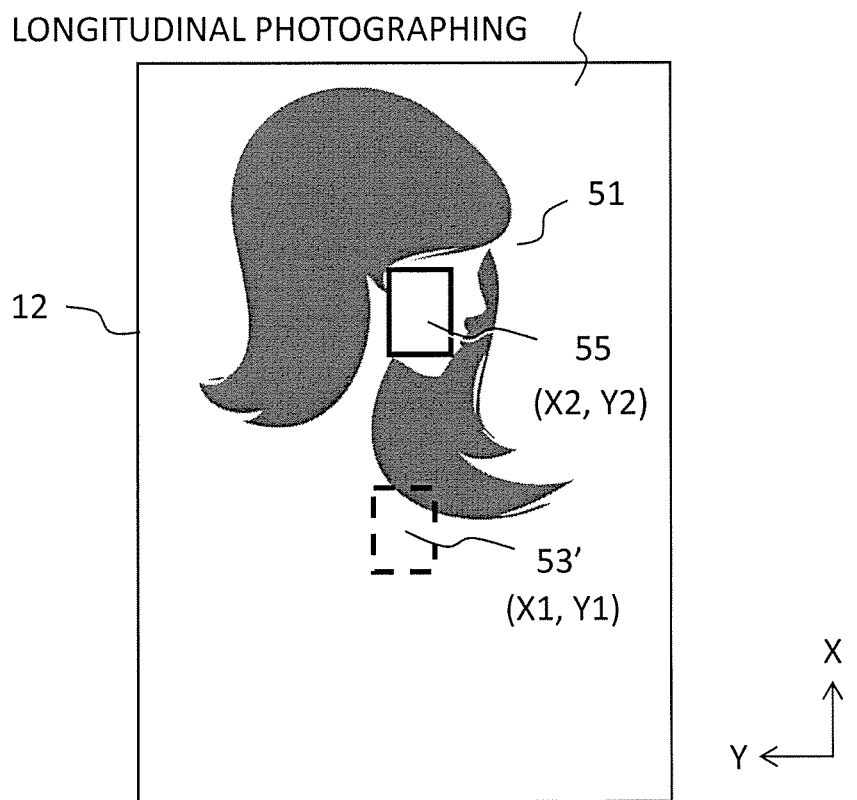
(b) LONGITUDINAL PHOTOGRAPHING

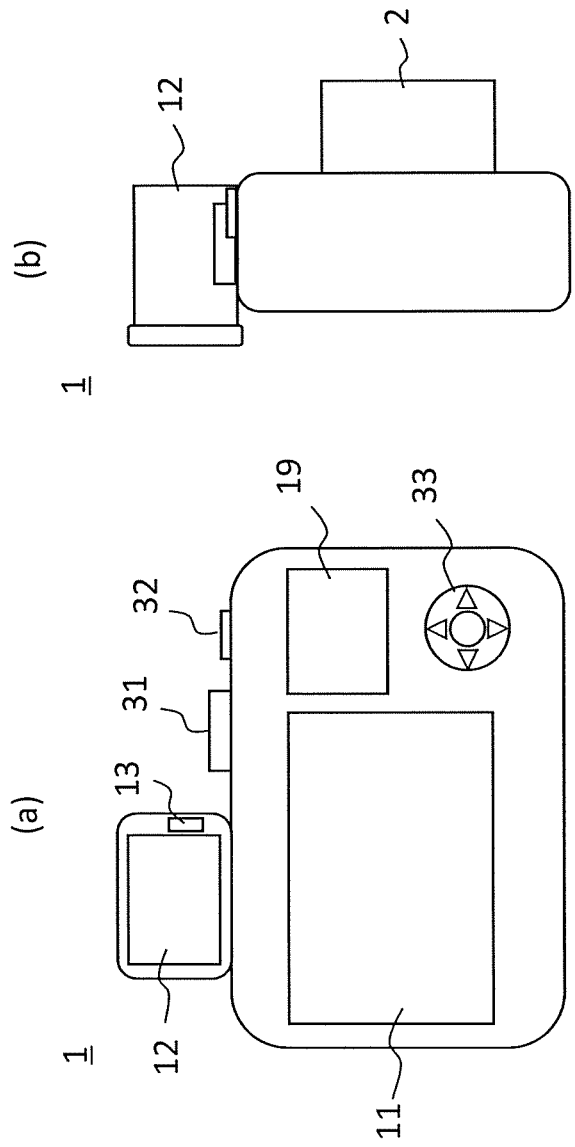

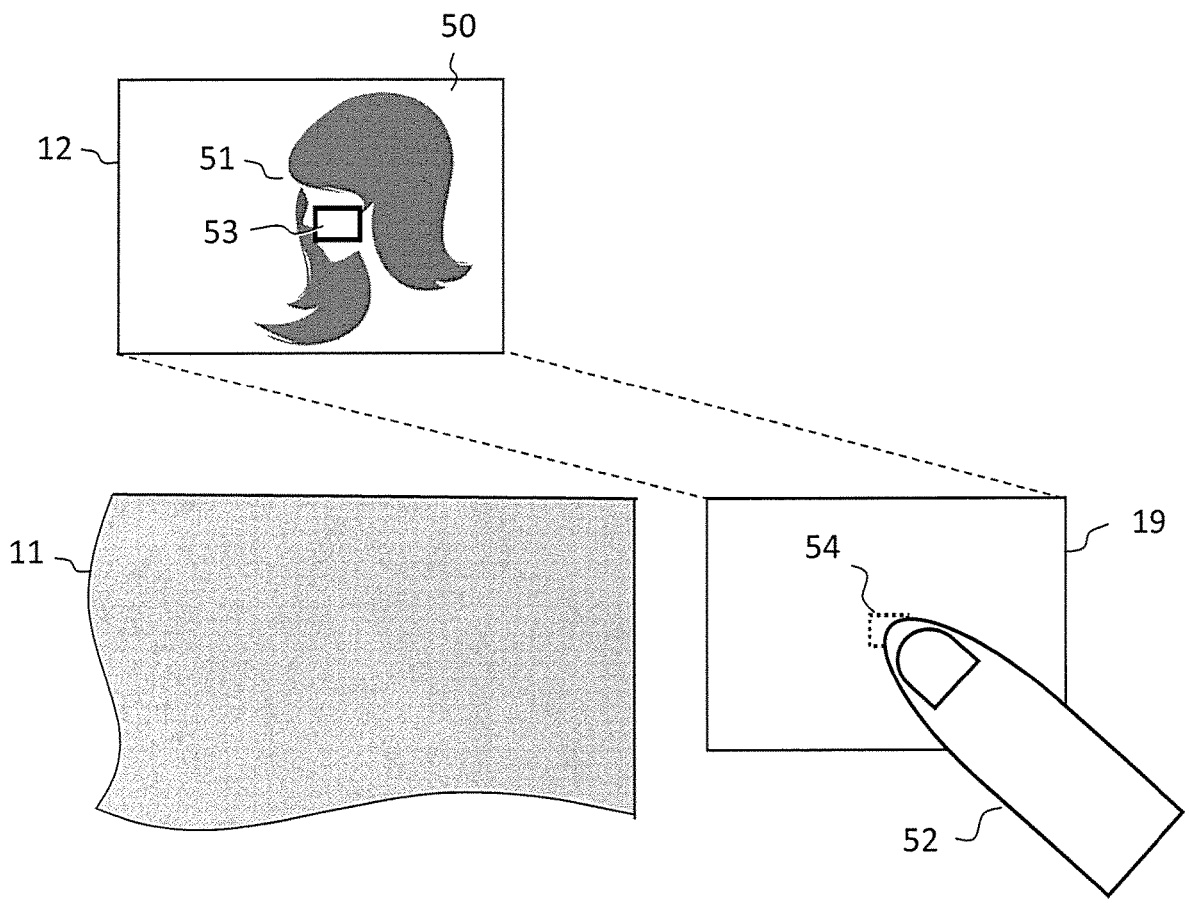

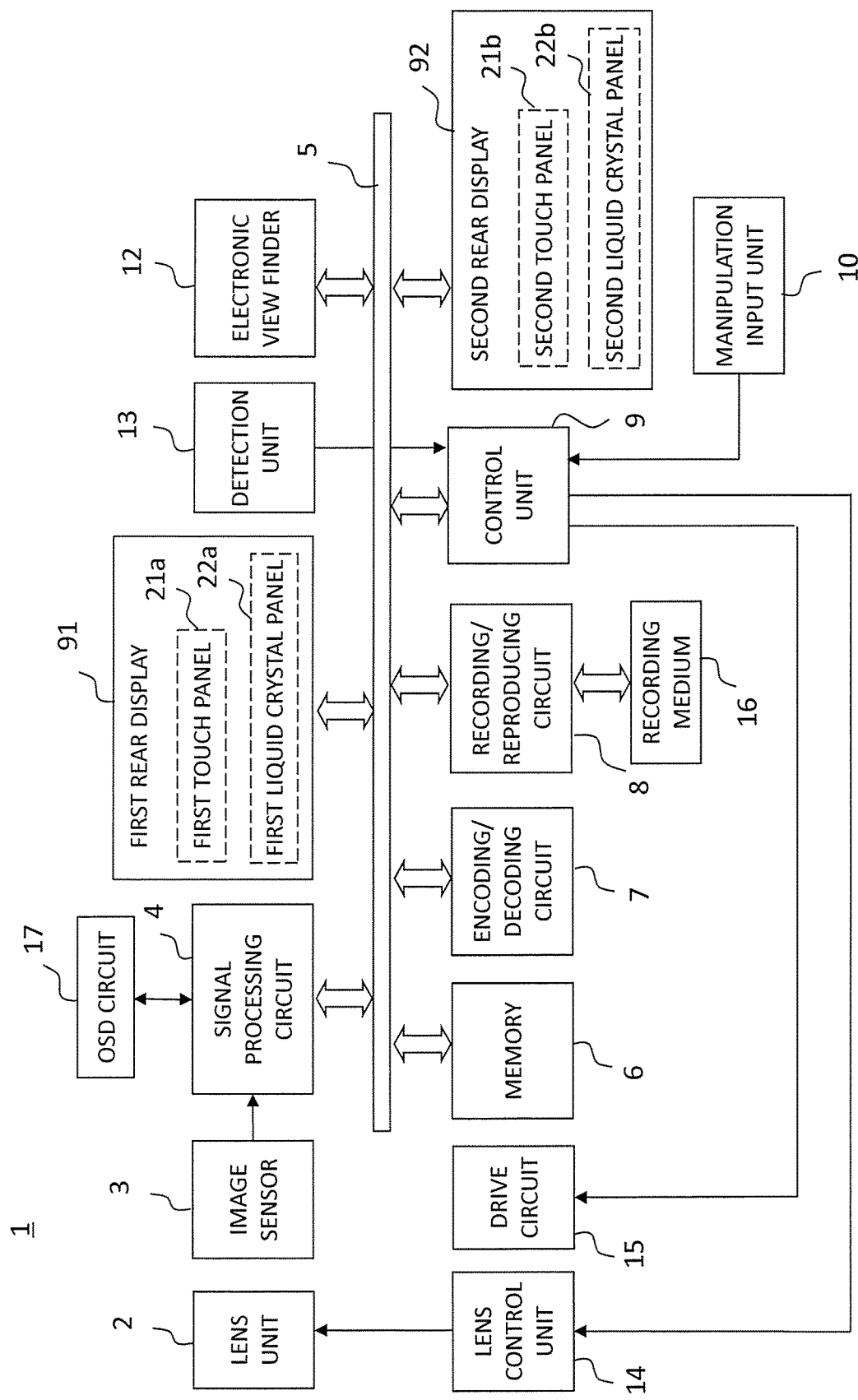
F I G. 15

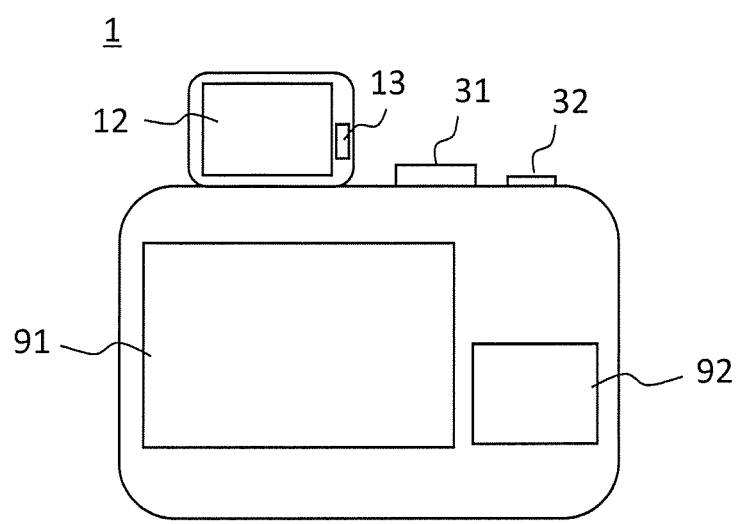
F I G. 1 6

WHEN REAR DISPLAY IS USED

WHEN ELECTRONIC VIEWFINDER IS USED

IMAGING DEVICE

CROSS REFERENCE

This application is the continuation of U.S. application Ser. No. 16/072,498, filed Jul. 24, 2018, which is the U.S. National Phase under 35 U.S.C. § 371 of International Application No. PCT/JP2017/000664, filed on Jan. 11, 2017, which claims the benefit of Japanese Application No. 2016-014533, filed on Jan. 28, 2016 and Japanese Application No. 2016-105800, filed on May 27, 2016, the entire contents of each are hereby incorporated by reference.

TECHNICAL FIELD

The present invention relates to a technique of performing an auto focus (AF) manipulation using a touch panel in an imaging device including two display units, that is, a rear display and a viewfinder.

BACKGROUND ART

In imaging devices such as digital cameras that image a subject using an image sensor such as a CCD sensor or a CMOS sensor, a rear display which can be visually observed from a predetermined distance is generally mounted in order to display an image to be captured or a manipulation menu for a user. Since the rear display has a configuration in which a touch panel is integrated with a liquid crystal panel, the user can designate a position to be focused on while viewing an image of a subject being imaged. For example, Patent Document 1 discloses a configuration in which a focus frame used for controlling a focus set to an arbitrary position on an image displayed on a liquid crystal panel is controlled in accordance with a manipulation of a user on a touch panel, and a focus is controlled on the basis of an image inside the focus frame among images displayed on the liquid crystal panel.

Further, in the imaging devices such as the digital cameras, in addition to the rear display described above, a display (an electronic viewfinder (EVF)) for looking into an image to be captured and viewing it is commonly installed. Using the electronic viewfinder, it is easy to identify an image even in a bright environment such as outdoors in which a light blocking property is high, but a touch panel is unable to be incorporated, and operability is lower than in the rear display integrated with the touch panel. In this regard, Patent Document 2 discloses a configuration (an EVF manipulation mode) in which, when it is recognized that an electronic viewfinder is in use, the user can perform various touch manipulations using a touch panel installed on a front surface of a rear display (a liquid crystal monitor). In the EVF manipulation mode, a focus function is implemented by associating a position on an image displayed on the electronic viewfinder with a position on the touch panel of the rear display.

CITATION LIST

Patent Document

Patent Document 1: JP 2007-19685 A
Patent Document 2: WO 2012/001749 A

SUMMARY OF THE INVENTION

Problems to be Solved by the Invention

In the imaging devices such as the digital cameras, a manipulation method of performing imaging by manipulating the touch panel while viewing the subject with the electronic viewfinder as in the technique disclosed in Patent Document 2 is under review. Commonly, the user manipulates a shutter button with a right index finger while fixing a body by supporting a camera body from the bottom with a left hand and supporting a camera grip portion or a camera body right side with a right hand. At the same time, the user performs a touch manipulation on the touch panel on the rear display with a right thumb. Accordingly, the user can quickly cause a position of a desired subject to be focused on and perform imaging.

However, as the body of the camera increases in size, when the user tries to manipulate the touch panel with the right thumb through the above operation, it is difficult for the thumb to reach a left area of the rear display (the touch panel), leading to a deterioration in operability. At this time, the user can separate the right hand from the body and manipulate the touch panel, but the manipulation of the shutter button is delayed accordingly, and thus a time for the click of the shutter is likely to be missed.

Further, a user manipulation input button or the like is installed on the rear surface of the camera in addition to the rear display, and it is necessary to effectively use the rear surface area while securing these functions.

The present invention was made in light of the above problems, and it is an object of the present invention is to provide an imaging device which is excellent in operability on the touch panel when the electronic viewfinder is used.

Solutions to Problems

An imaging device of the present invention includes an image sensor that converts an optical image of a subject input via a focus lens into an imaging signal, a lens control unit that controls a position of the focus lens such that a focus operation is performed on the set focus area, a signal processing circuit that generates a video signal from an output signal of the image sensor, a first display that displays an image of the subject using the video signal output from the signal processing circuit, a second display that displays the image of the subject using the video signal output from the signal processing circuit, a display converting unit that switches whether the image of the subject is displayed on the first display or the second display, and a touch panel that detects a touch manipulation position of the user in order to set the focus area for the image of the subject displayed on the first display or the second display. An effective detection area for detecting the touch manipulation position of the user is set in the touch panel, corresponding to the entire display screen of the first display or the second display, and a size of the effective detection area when the image is displayed on the first display is different from a size when the image is displayed on the second display.

Alternatively, an imaging device of the present invention includes an image sensor that converts an optical image of the subject input via a focus lens into an imaging signal, a lens control unit that controls a position of the focus lens such that a focus operation is performed on the set focus area, a signal processing circuit that generates a video signal from an output signal of the image sensor, a first display that displays an image of the subject using the video signal output from the signal processing circuit, a second display that displays the image of the subject using the video signal output from the signal processing circuit, a display converting unit that switches whether the image of the subject is displayed on the first display or the second display, a first touch panel that detects a touch manipulation position of the user in order to set the focus area for the image of the subject displayed on the first display, and a second touch panel that detects a touch manipulation position of the user in order to set the focus area for the image of the subject displayed on the second display.

Effects of the Invention

According to the present invention, it is possible to provide an imaging device in which, when a focus area is set by a touch panel installed in a rear display while checking a subject through an electronic viewfinder, even in a case in which a rear display has a large screen, it is easy for the user to manipulate, and usability is excellent.

Alternatively, according to the present invention, it is possible to provide an imaging device in which a touch panel dedicated to the use of an electronic viewfinder is installed on a rear surface of the imaging device, and thus even in a case in which a rear display has a large screen, it is easy for the user to manipulate, and usability is excellent.

BRIEF DESCRIPTION OF THE DRAWINGS

FIG. 1 is a block diagram illustrating a configuration of an imaging device according to a first embodiment.

FIG. 2 is a diagram illustrating an example of a cross-sectional structure of a rear display.

FIG. 3 is an external diagram illustrating an imaging device according to the first embodiment.

FIG. 9 is a diagram illustrating an example of setting a focus area when lateral photographing/longitudinal photographing is changed (a second embodiment).

FIG. 12 is an external diagram illustrating an imaging device according to the fourth embodiment.

FIG. 13 is an explanatory diagram of a method of setting a focus area on a display image of an electronic viewfinder.

FIG. 14 is a diagram illustrating a display example of a menu screen associated with a focus operation.

FIG. 15 is a block diagram illustrating a configuration of an imaging device according to a fifth embodiment.

FIG. 16 is an external diagram illustrating an imaging device according to the fifth embodiment.

MODE FOR CARRYING OUT THE INVENTION

Figure 4:
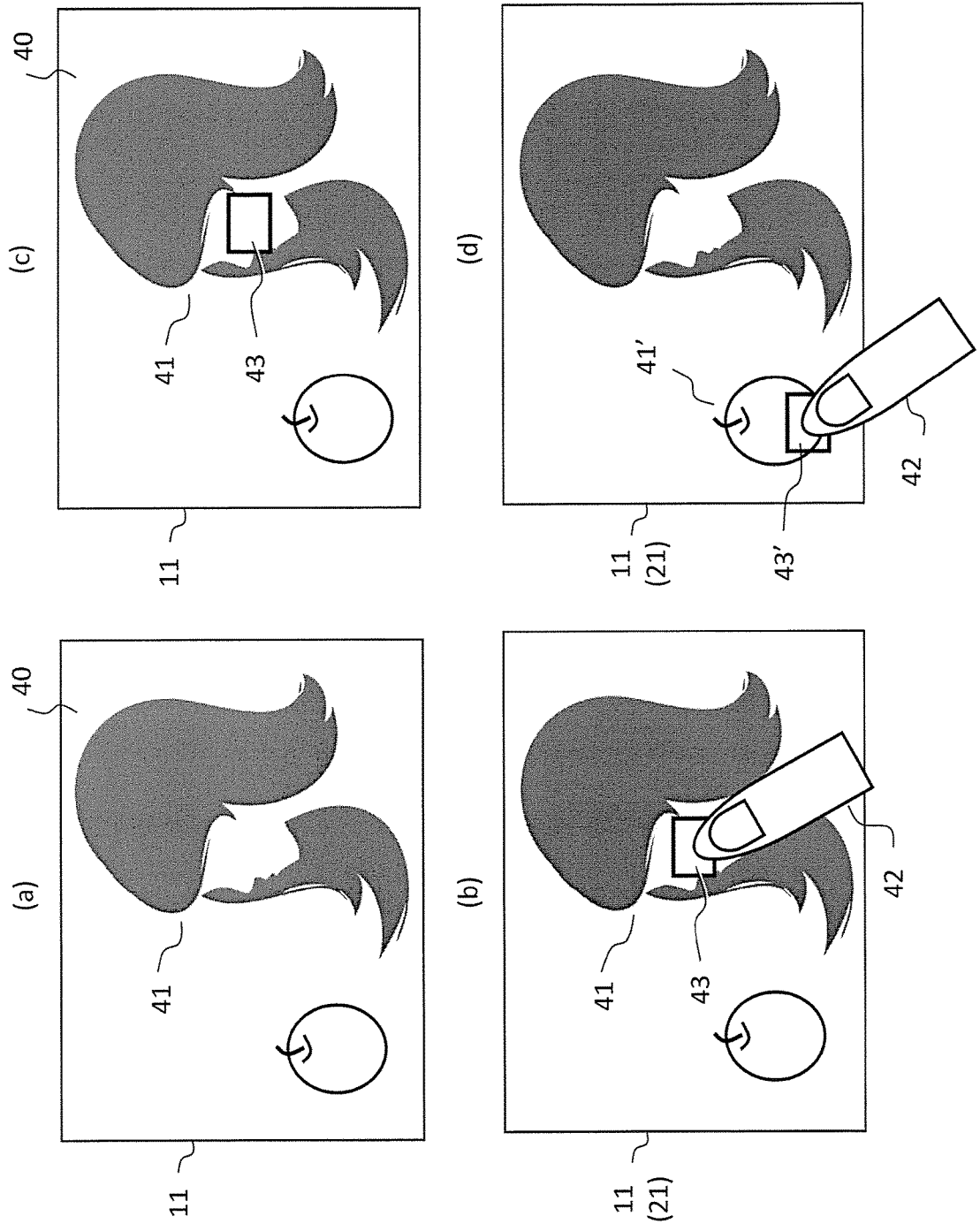
FIG. 4 is an explanatory diagram of a method of setting a focus area on a display screen of a rear display.

Hereinafter, exemplary embodiments of the present invention will be described with reference to the appended drawings.

First Embodiment

FIG. 1 is a block diagram illustrating a configuration of an imaging device according to a first embodiment. An imaging device 1 of the present embodiment includes two display units, that is, a rear display 11 and an electronic viewfinder 12, and the rear display 11 has a structure in which a touch panel 21 is integrated with a liquid crystal panel 22. Hereinafter, configurations of the respective units in the device will be described.

A lens unit 2 is configured with a plurality of lenses including a focus lens, and a lens control unit 14 controls a position of a focus lens such that a focusing operation is performed.

An image sensor 3 is an image sensor of a system such as CMOS or a CCD. In the image sensor 3, photoelectric conversion elements such as photodiode are two-dimensionally arranged on an imaging plane, and an optical image of a subject formed the imaging plane via the lens unit 2 is converted into an imaging signal through photoelectric conversion. The image sensor 3 includes an AD conversion circuit that converts an analog signal into a digital signal and outputs a digitized imaging signal. Further, pixels for a phase difference autofocus (AF) can be arranged in the image sensor 3 to implement a high-speed AF. In a case in which an image sensor including no AD conversion circuit therein is used, an AD conversion circuit may be installed outside the image sensor 3. A drive circuit 15 drives the image sensor 3 in accordance with an operation mode.

A signal processing circuit 4 performs various kinds of signal processing such as filtering, amplification according to a sensitivity setting, and white balance correction on an output signal from the image sensor 3. The signal processing circuit 4 generates a video signal for display or a video signal for recording (a moving image or a still image) in accordance with the operation mode. The signal processing circuit 4 instructs an on-screen display (OSD) circuit 17 to generate an OSD signal for display. The OSD signal includes a display signal of a focus frame which will be described later.

In addition to the signal processing circuit 4, a memory 6 such as a DRAM and a flash memory, an encoding/decoding circuit 7, a recording/reproducing circuit 8, and the like are connected to a bus 5, and a high-speed cooperative process and control of the respective units connected to the bus 5 can be performed. The encoding/decoding circuit 7 performs an encoding process for recording on the video signal which has undergone the signal processing and performs a decoding process on reproduced image data. The recording/reproducing circuit 8 records captured image data in a recording medium 16 and reproduces an image recorded in the recording medium 16. A control unit 9 controls the respective units such as the lens control unit 14, the drive circuit 15, the signal processing circuit 4, the memory 6, the encoding/decoding circuit 7, the recording/reproducing circuit 8, the rear display 11, and the electronic viewfinder 12 and the entire imaging device 1.

A manipulation input unit 10 receives a manipulation input of the user, and a manipulation frequently used by the user among settings in the imaging device 1 is allocated. Specifically, as will be described later, a mode setting dial, a shutter button, a mode setting button, and the like correspond to it.

The rear display 11 has a structure in which the touch panel 21 is integrated with the liquid crystal panel 22 and will be described later in detail. The electronic viewfinder 12 is a display for looking into an image to be captured and viewing it. The user performs monitoring at the time of photographing, checking of a reproduction image, or the like using either the rear display 11 or the electronic viewfinder 12. Commonly, any one of display units is preferably used, and the display unit is automatically switched on the basis of a detection result of a detection unit 13.

The detection unit 13 includes, for example, an infrared light emitting element and a light receiving element, and an object (for example, a face of the user) located before the detection unit 13 is detected by detecting reflected light of infrared light output from the infrared light emitting element through the light receiving element. Alternatively, the detection unit 13 may include an ultrasonic transmitter and a receiver, and a method in which an ultrasonic wave transmitted by the ultrasonic transmitter is detected by the receiver may be used.

In a case in which the user uses the electronic viewfinder 12, the detection unit 13 detects the approach of the face, the head, or the like of the user, and performs control such that an image is displayed only on the electronic viewfinder 12, and no image is displayed on the rear display 11. Conversely, in a case in which the object is unable to be detected by the detection unit 13, control is performed such that an image is displayed only on the rear display 11. As described above, the power consumption of the device is reduced by switching the display unit of the image.

The display of the rear display 11 and the display of the electronic viewfinder 12 are automatically switched in accordance with the detection result of the detection unit 13, but, for example, an on/off setting of an automatic switching function is performed, and when automatic switching is turned off, the display of the rear display 11 and the display of the electronic viewfinder 12 may be manually switched by the user.

FIG. 2 is a diagram illustrating an example of a cross-sectional structure of the rear display 11. In the rear display 11, the touch panel 21 is integrated with the liquid crystal panel 22, and a protection cover 20 such as glass and a backlight 23 are arranged on outer sides thereof. In this case, the touch panel 21 detects electrostatic capacitance via the protection cover 20, and a detection accuracy is improved by arranging the touch panel 21 to come into close contact with the protection cover 20. The backlight 23 irradiates illumination light from the rear surface of the liquid crystal panel 22 so that an image is displayed. At this time, when there is no use by the user for a certain period of time, control may be performed such that the backlight 23 is turned off to reduce the power consumption. A scheme of the display unit is not limited to a liquid crystal, but an arbitrary scheme such as an organic EL may be used. In the case of using a light emitting element such as an organic EL, no backlight is necessary.

The touch panel 21 employs, for example, a capacitive type, and transparent electrodes are two-dimensionally arranged in a horizontal direction and a vertical direction. If the user's finger or stylus touches or approaches the display screen of the rear display 11, the capacitance between the transparent electrode and the finger or the touch pen changes, and positions in the horizontal and vertical directions on the touching screen are detected. With the touch panel 21, the user can perform various kinds of inputs or manipulations on the imaging device. Particularly, in the present embodiment, the touch panel 21 has a function of causing an arbitrary position on the screen to be focused on by a touch panel manipulation. In addition to the capacitive type, a pressure sensitive scheme or the like may be employed in the touch panel 21.

FIG. 3 is an external diagram illustrating the imaging device according to the first embodiment, and FIG. 3(*a*) is a diagram of the imaging device viewed from the rear surface, and FIG. 3(*b*) is a diagram of the imaging device viewed from the right side. In the imaging device 1, the rear display 11 integrated with the touch panel is arranged on a rear surface side, and the electronic viewfinder 12 is arranged on an upper side. Further, the detection unit 13 for detecting the approach of the object is installed on a display side of the electronic viewfinder 12. The detection unit 13 detects the user who is using (looking into) the electronic viewfinder 12, for example, using infrared light or the like.

As the manipulation input unit 10 of the imaging device 1, a mode setting dial 31, a shutter button 32, and a manipulation button 33 are installed. The mode setting dial 31 is to select an operation mode of the imaging device 1 (a photographing mode/reproduction mode or the like). The shutter button 32 is installed on the upper right side of the body, and a photographing manipulation is performed by pushing the shutter button 32. The manipulation button 33 includes a central button and four direction buttons (up, down, left, and right buttons) and is to display or select the menu screen.

In a case in which the electronic viewfinder 12 is used, the user can manipulate the shutter button 32 with, for example, the right index finger or manipulate the touch panel 21 installed in the rear display 11 with the right thumb while looking into the electronic viewfinder 12.

The operation mode of imaging device includes <photographing mode> and <reproduction mode>, and these operations will be described below. Switching between these operation modes may be performed by using the mode setting dial 31, or for example, a dedicated reproduction mode button may be installed to switch the operation mode.

<Photographing Mode>

Upon detecting that the photographing mode is set by the manipulation input unit 10, the control unit 9 performs control according to the photographing mode on the image sensor 3, the signal processing circuit 4, the encoding/decoding circuit 7, the recording/reproducing circuit 8, the rear display 11, the electronic viewfinder 12, or the like. Still image capturing and moving image capturing can be performed in the photographing mode.

An imaging signal is read out from the image sensor 3 with a predetermined period, undergoes predetermined signal processing by the signal processing circuit 4, and is converted into a display format, and a moving image is displayed on the rear display 11 or the electronic viewfinder 12 in real time. At this time, switching of the display unit is performed in accordance with the detection result of the detection unit 13. The user monitors the moving image displayed on the rear display 11 or the electronic viewfinder 12.

In a case in which a still image is captured, the user pushes the shutter button 32. The control unit 9 detects that the shutter button 32 is pushed from an output of the manipulation input unit 10 and controls the drive circuit 15 of the image sensor 3 such that an aperture value, a shutter speed, and the like are adjusted in accordance with a photographing condition set by the user. The image signal of the still image captured by the image sensor 3 undergoes predetermined still image signal processing by the signal processing circuit 4 via the memory 6 and then undergoes still image encoding by the encoding/decoding circuit 7. For example, a JPEG scheme is employed as the encoding scheme, but the still image may be recorded in a high-quality RAW format by employing a scheme other than JPEG. The encoded still image data is recorded in the recording medium 16 by the recording/reproducing circuit 8 via the memory 6.

In a case in which a moving image is captured, photographing is performed by pushing a moving image capturing button (not illustrated), and if the moving image capturing button is pushed again, the photographing is stopped. The moving image is preferably encoded in an MPEG format such as H264, H265 or any other moving image format. In the case of moving image capturing, a moving image is encoded in a predetermined format by the encoding/decoding circuit 7, and the encoded moving image data is recorded in the recording medium 16 by the recording/reproducing circuit 8 via the memory 6.

<Reproduction Mode>

Upon detecting that the reproduction mode is set by the manipulation input unit 10, the control unit 9 reads the still image or the moving image recorded in the recording medium 16 by the recording/reproducing circuit 8. Then, the still image or the moving image is decoded by the encoding/decoding circuit 7, and then control is performed such that the still image or the moving image is displayed on the rear display 11 or the electronic viewfinder 12. Switching of the display unit is performed in accordance with the detection result of the detection unit 13, similarly to the photographing mode. In the reproduction operation, thumbnail images of a plurality of images are first displayed on multiple screens, and an image selected by the touch panel manipulation or the like is reproduced and displayed on the selected display unit.

Next, an operation of setting the focus area by the touch panel manipulation which is one of features of the present embodiment will be described. This operation is applied when the still image capturing is performed in the photographing mode. The focus area may be set while viewing the rear display 11 and may be performed while viewing the electronic viewfinder 12, and both cases will be described. Both cases are performed by the manipulation of touching the touch panel 21 installed in the rear display 11 with the finger.

FIG. 4 is a diagram for explaining a method of setting the focus area on the display screen of the rear display 11, and FIGS. 4(a) to 4(d) illustrate a setting procedure.

FIG. 4(a) is a display screen 40 of the rear display 11 before the touch panel manipulation is performed, and a captured moving image is displayed in real time. Here, a subject 41 is displayed as an example. If the user touches the subject 41 on the screen with a finger 42 as illustrated in FIG. 4(b), the touch panel 21 installed in the rear display 11 detects a touched screen position. The control unit 9 sets the position detected by the touch panel 21 as the focus area and controls the OSD circuit 17 such that a focus frame 43 indicating the focus area is displayed superimposed on the image. Accordingly, the user can easily check the set focus area. The focus frame 43 is not displayed in FIG. 4(a), but when the position of the focus area is set by default, a focus frame set by default may be displayed from the beginning.

Once the focus area is set, the focus frame 43 is continuously displayed on the display screen 40 as illustrated in FIG. 4(c). Further, when the user desires to change the focus area, it is preferable to touch a new focus position on the screen with the finger 42. For example, if the touch manipulation is performed on another subject 41' as illustrated in FIG. 4(d), the control unit 9 sets and changes the touched position as a new focus area, erases the focus frame 43 being displayed, and causes a new focus frame 43' to be displayed.

As described above, when the focus area is set while viewing the rear display 11, the user can perform the focus operation on the position of the touched subject by touching the position of the subject which is desired to be focused on.

Next, an operation of setting the focus area while monitoring the image using the electronic viewfinder 12 will be described.

Figure 5:
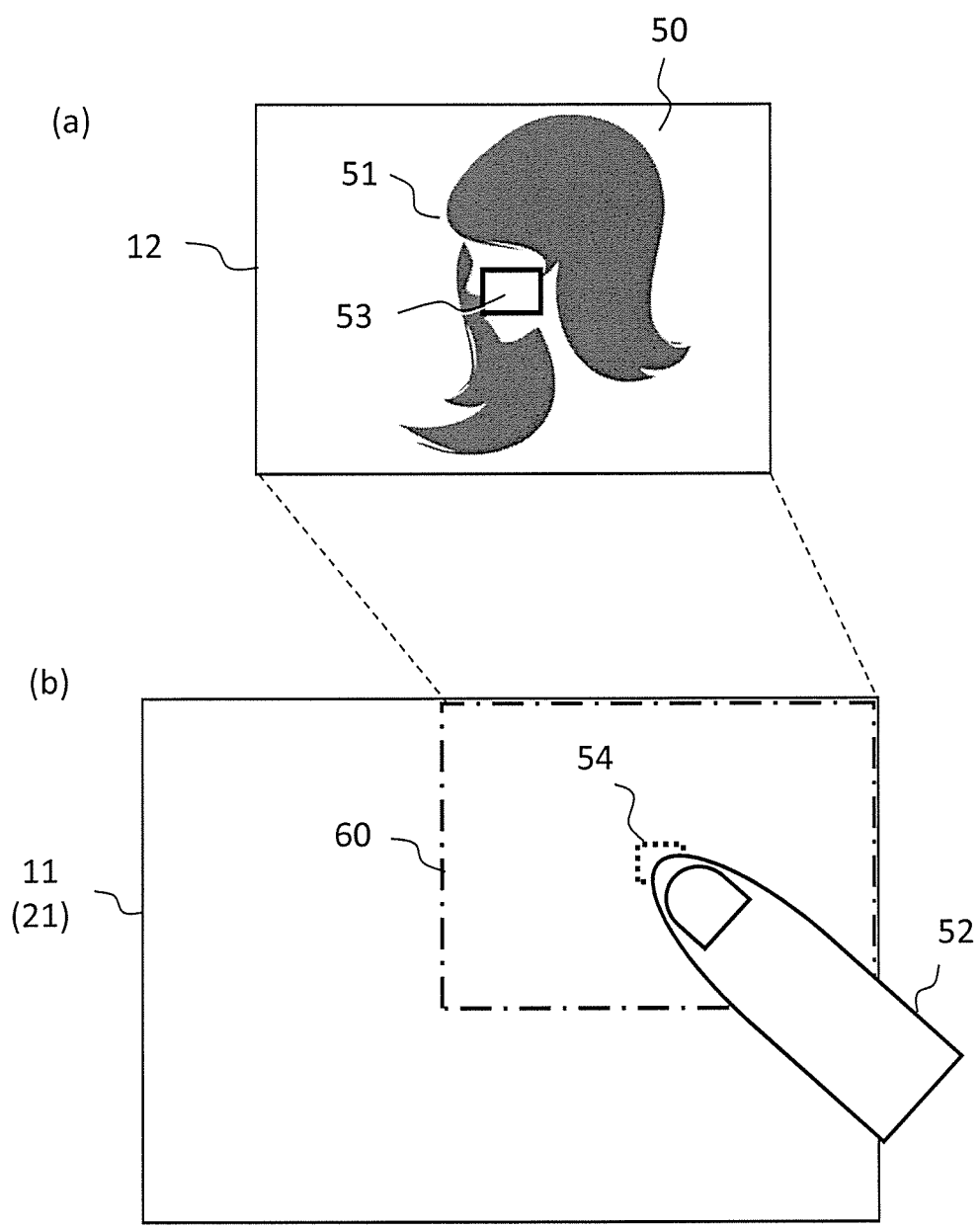
FIG. 5 is an explanatory diagram of a method of setting a focus area on a display image of an electronic viewfinder.

FIG. 5 is a diagram for describing a method of setting the focus area on the display image of the electronic viewfinder 12 through the touch panel 21 of the rear display 11. FIG. 5(a) illustrates a display screen 50 of the electronic viewfinder 12, and FIG. 5(b) illustrates the touch surface of the touch panel 21 installed in the rear display 11. As illustrated in FIG. 3, a screen size of the electronic viewfinder 12 of FIG. 5(a) is significantly smaller than a screen size of the rear display 11 of FIG. 5(b), but here, it is illustrated with an arbitrary size.

If the user looks into the electronic viewfinder 12, the detection unit 13 detects that the face of the user approaches the electronic viewfinder 12, and the control unit 9 causes the video signal to be output to the electronic viewfinder 12, and causes the video output to the rear display 11 to be stopped. Further, the backlight 23 of the rear display 11 is turned off to reduce the power consumption. At this time, the detection operation of the touch panel 21 installed in the rear display 11 is enabled, and the focus area is set for the image displayed on the electronic viewfinder 12 by using the detection operation. Here, in the present embodiment, an area for detecting the touch manipulation in the touch panel 21 (hereinafter referred to as an "effective detection area") is reduced and set. In other words, when the image is displayed on the rear display 11, the effective detection area of the touch panel 21 is changed to be different from that when the image is displayed on the electronic viewfinder 12.

As illustrated in FIG. 5(a), a subject 51 is displayed on the display screen 50 of the electronic viewfinder 12. As illustrated in FIG. 5(b), on the touch panel 21 of the rear display 11, an effective detection area 60 for detecting the touch manipulation of the user is reduced to an upper right portion of the touch surface and set. In other words, as illustrated in FIG. 4, when the image is displayed on the rear display 11, substantially the entire surface of the touch panel 21 is set as the effective detection area, whereas when the image is displayed on the electronic viewfinder 12, the detection can be performed only in the effective detection area 60. Then, the reduced effective detection area 60 is associated with the entire display screen 50 of FIG. 5(a), and thus the focus area can be set for an arbitrary position in the display screen 50.

For example, the user touches a focus position 54 in the effective detection area 60 of the touch panel 21 with a right hand thumb 52. The control unit 9 sets the focus area for the position (the display position of the subject 51 in this example) in the display screen 50 of the electronic viewfinder 12 corresponding thereto and causes a focus frame 53 indicating the focus area to be displayed. In this case, even when the user touches a position outside the effective detection area 60, it is not reflected in the focus area setting operation.

In a case in which the manipulation of setting the focus area is performed while looking into the electronic viewfinder 12, in general, the user often manipulates the focus position with the right hand thumb 52 and manipulates the shutter button with an index finger while supporting the body of the camera with the left hand and gripping the grip part of the body with the right hand. Since the effective detection area 60 of the touch panel 21 is reduced to the upper right portion and set as in the present embodiment, it is easy to manipulate the touch panel 21 with the right hand thumb 52 even when the rear display 11 has a large screen. In other words, the user can perform the touch manipulation at a desired position in the effective detection area 60 without separating the right hand from the body. As a result, it is possible to promptly perform the focus positioning and the cooperative manipulation with the shutter button, and the usability is greatly improved.

As described above, in the present embodiment, when the image is displayed on the rear display 11, the effective detection area of the touch panel 21 is changed to be different from that when the image is displayed on the electronic viewfinder 12. This operation will be described by comparing both cases.

Figure 6:
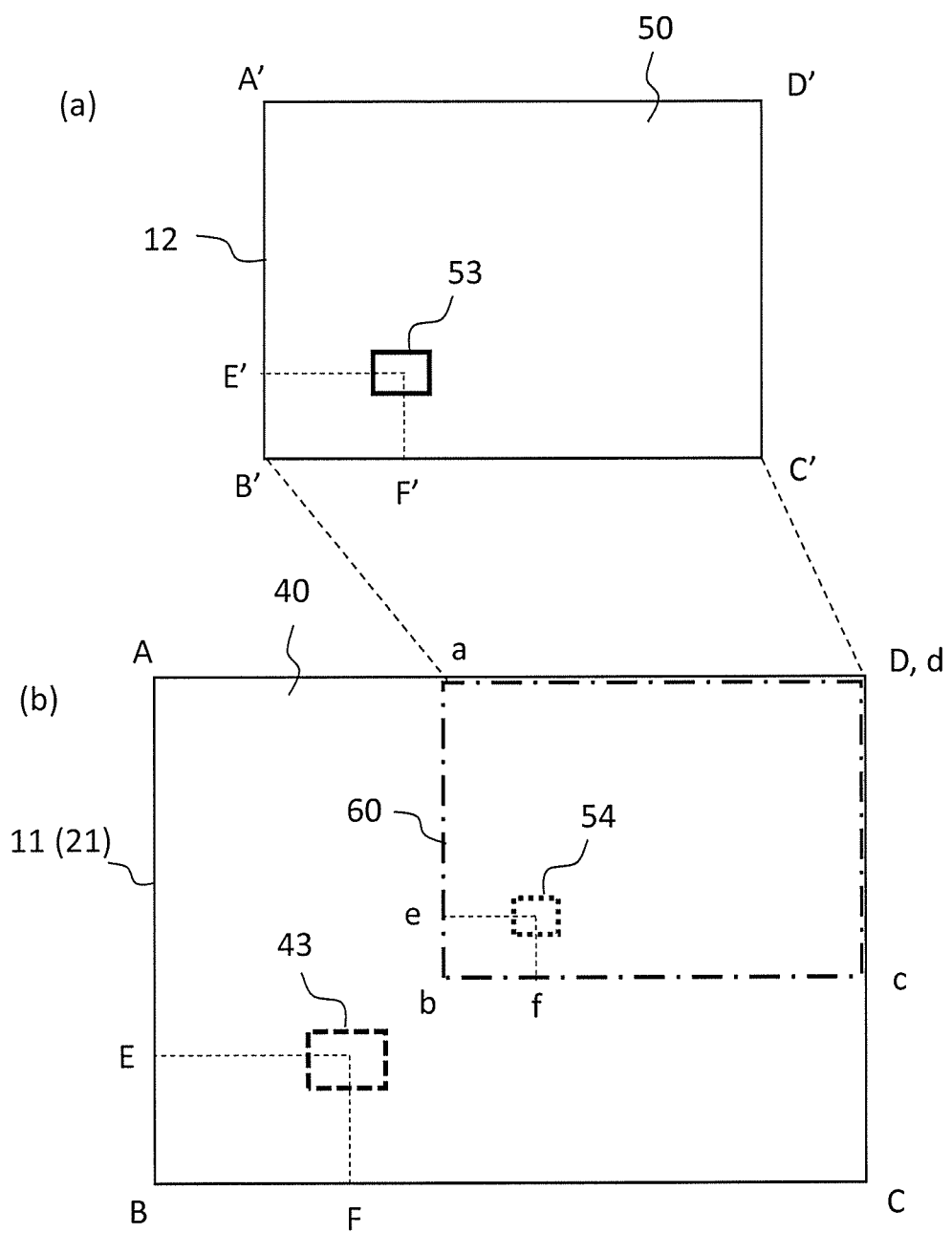
FIG. 6 is a diagram illustrating a positional relation between an image display screen and a detection area of a touch panel.

FIG. 6 is a diagram illustrating a positional relation between the image display screen and the detection area of the touch panel. Here, FIG. 6(a) illustrates the display screen 50 of the electronic viewfinder 12, and a screen size is a rectangular area A'B'C'D'. On the other hand, FIG. 6(b) illustrates the display screen 40 of the rear display 11, and a screen size is a rectangular area ABCD. The rear display 11 includes the touch panel 21 installed therein, and the size of the touch surface is substantially equal to the rectangular area ABCD. A size ratio between the display screen 40 and the display screen 50 is arbitrary, but here, aspect ratios are assumed to be equal to each other for the sake of simplicity (AB:BC=A'B':B'C').

First, when the image is displayed on the rear display 11, the effective detection area of the touch panel 21 is the entire surface of the rear display 11 and substantially coincides with the rectangular area ABCD. In other words, a touch position (coordinates (F, E)) on the touch panel 21 is a display position of the display screen 40, and the focus frame 43 is displayed at the touch position.

On the other hand, when the image is displayed on the electronic viewfinder 12, the effective detection area of the touch panel 21 is the reduced effective detection area 60 (a rectangular area abcd) as illustrated in FIG. 5. As a result, coordinates (f, e) of a touch position 54 in the effective detection area 60 does not generally coincide with a focus position of the display screen 50 to be associated with it, that is, coordinates (F', E') at which a focus frame 53 is desired to be displayed.

In this regard, coordinate conversion is necessary, but in order to facilitate the conversion, it is preferable to reduce and set the shape of the effective detection area 60 so that the relation of ab:bc=AB:BC=A'B':B'C' is substantially satisfied, that is, the aspect ratio of the effective detection area 60 is substantially equal to the aspect ratio of the display screen 40 (that is, the aspect ratio of the display screen 50). Accordingly, the coordinates (f, e) of the touch position 54 in the effective detection area 60 of the touch panel 21 and the coordinates (F', E') of the focus frame 53 of the display screen 50 can be easily converted using one conversion coefficients (f/F'=e/E'=k). Further, since the aspect ratios are made equal to each other, the user can perform the positioning manipulation in the vertical direction and the horizontal direction with a more natural sense.

It is preferable that a reduction ratio of the effective detection area 60 be set to, for example, ab:AB=1:2, and the effective detection area 60 of the touch panel 21 be set in an area of one quarter of the upper right corner of the rear display 11. At this time, the conversion coefficient k is 0.5.

The size of the effective detection area 60 can also be set by changing the user as follows depending on the size of the rear display 11 and the use state of the user.

Figure 7:
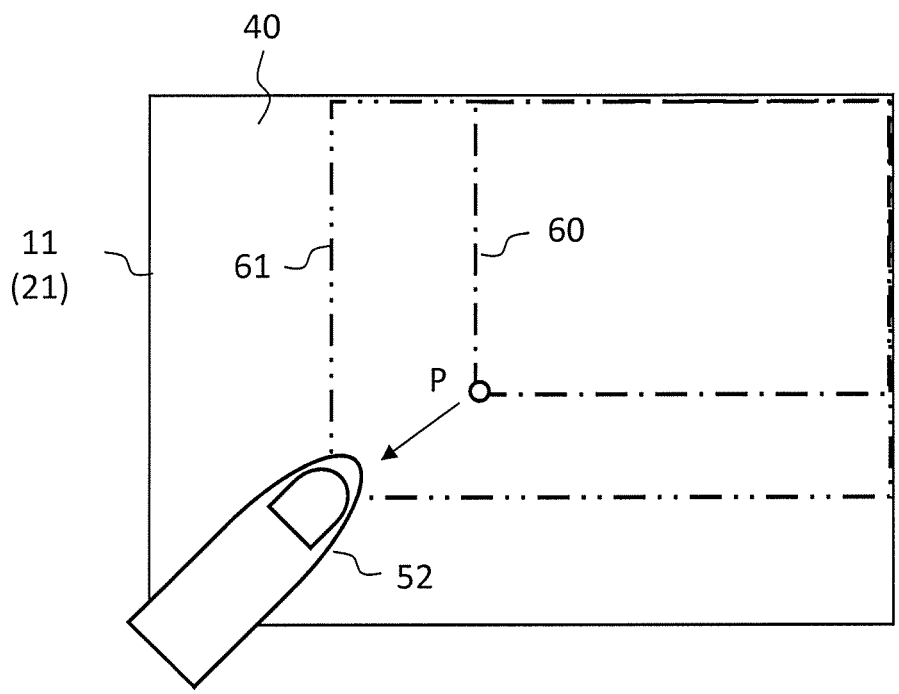
FIG. 7 is a diagram illustrating an example of a method of changing an effective detection area by a user.

FIG. 7 is a diagram illustrating an example of a method of changing the effective detection area 60 by the user. The effective detection area 60 of the currently set touch panel 21 is illustrated on the display screen 40 of the rear display 11. For example, the user can set a new effective detection area 61 by dragging a lower left corner portion P of the effective detection area 60 in a lower left direction (indicated by an arrow) (moves a finger 52 in a state touching on the screen), moving the finger 52 to a desired position, and then separating the finger 52 from the screen. Accordingly, the touch panel 21 detects the touch position on the basis of the new effective detection area 61 set by the user. The control unit 9 changes the conversion coefficient k on the basis of the area size of the new effective detection area 61 and performs a coordinate conversion process from the touch detection position to the position of the display screen of the electronic viewfinder 12.

In the above example, the aspect ratio of the effective detection area 60 is changed to be equal to the aspect ratio of the display screen 50 of the electronic viewfinder 12, but the aspect ratio of the effective detection area 60 may be different from the aspect ratio of the display screen 50 of the electronic viewfinder 12. For example, when the focus positioning manipulation is mainly performed in the horizontal direction of the screen, the operability of the user may be further improved by setting the effective detection area 60 in a horizontally long form. In this case, it is preferable that the reduction ratio of the effective detection area 60 in the vertical direction be different from that in the horizontal direction, and the conversion coefficient in the vertical direction and the conversion coefficients in the horizontal direction be decided in accordance with the reduction ratio.

In the above example, the effective detection area 60 of the touch panel 21 when the electronic viewfinder 12 is used is set in the upper right corner of the screen, but the present invention is not limited to this example. For example, a left-handed user can easily perform the touch panel manipulation using the left finger when the effective detection area 60 is set in the lower left corner or the upper left corner. As described above, even when the arrangement of the effective detection area 60 is changed, it is also possible to cope with it by changing the manipulation of moving the effective detection area 60.

Next, an operation of actually focusing on the focus area on the screen set by the above operation will be described. Video auto focus (AF) and phase difference AF can be used as the autofocus scheme in the imaging device.

The video AF is a scheme of adjusting a focus while controlling the focus lens so that the video signal of the focus area is focused on. For this reason, a high-frequency component of the video signal of the set focus area is extracted, and the position of the focus lens is controlled so that the high-frequency component becomes maximum. Information related to the set focus area is transferred to the signal processing circuit 4 by the control unit 9, and the signal processing circuit 4 detects the high-frequency components within the set focus area. Since the lens control unit 14 is controlled such that the detected high-frequency component becomes maximum as described above, it is possible to cause the set focus area to be focused on.

On the other hand, the phase difference AF is performed by using an image sensor including phase difference AF pixels or a dedicated phase difference AF sensor. In a case in which a dedicated phase difference AF is installed, preferably, a half mirror or the like is installed on a path between the lens and the image sensor to split incident light from the lens in two directions, an image sensor is installed in one direction, and the phase difference AF sensor is installed in the other direction. The phase difference AF is a scheme of detecting the phase difference of images passed through two different paths and adjusting a focus, and since it is possible to adjust a focus on the basis of the phase difference, it is possible to adjust a focus at a high speed. In a case in which a dedicated phase difference AF sensor or an image sensor including the phase difference AF pixels, the focus lens is preferably controlled so that the pixel of the phase difference AF sensor located in an area set by the user is focused on.

If the two schemes are compared, the video AF is slower in speed than the phase difference AF because the focus position is searched for while driving the lens. However, since focus control can be performed using the image sensor, the dedicated phase difference AF sensor and an optical system therefor are unnecessary, and an AF detection area can be set at any position of the image sensor, and thus there is an advantage in that an arbitrary position can be easily focused on.

A timing of the focus operation is associated with an operation of the shutter button 32. As states of the shutter button, generally there are a half-pushed state and a full-pushed state, and the focus operation is performed when the shutter button is in the half-pushed state. In other words, the control unit 9 sets the position touched by the user using the touch panel 21 as the focus area, detects the halfway push of the shutter button, and performs control such that the area is focused on.

As described above, the position on the touch panel designated by the user can be quickly focused on. Further, it is possible to capture and record the image in which a desired subject is focused on by pushing the shutter button quickly (the fully pushed state) after focusing. In order to perform the focus operation quickly, the focus area may be set when the user performs the touch manipulation on the screen, and the focus control may be executed immediately although the shutter button is not pushed halfway.

Figure 8:
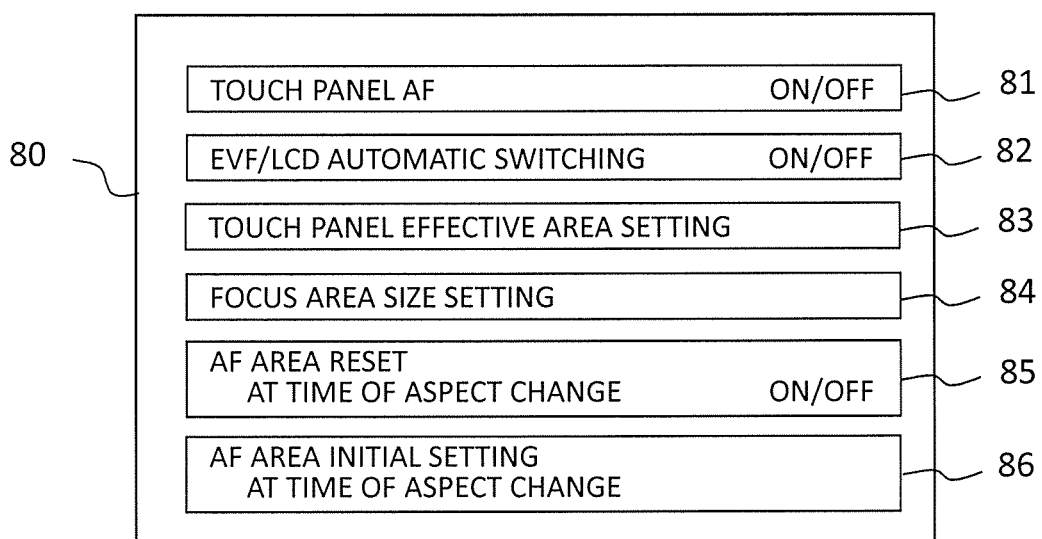
FIG. 8 is a diagram illustrating a display example of a menu screen associated with a focus operation.

FIG. 8 is a diagram illustrating a display example of a menu screen associated with the focus operation. For example, when the center part of the manipulation button 33 is pushed, a menu screen 80 is displayed on the rear display 11, and the user selects and sets a menu by the touch manipulation. Here, the menu associated with the focus operation in the displayed menu screen is illustrated.

A touch panel AF 81 is a setting menu for using the auto focus (AF) function by the touch panel manipulation. When an ON/OFF display part one the right side is touched, ON and OFF are switched in a toggle manner. When ON is set, an AF area setting manipulation can be performed by the touch panel manipulation, and when OFF is set, the AF area setting manipulation is disabled. Therefore, in a case in which the focus area is set by the touch panel manipulation, this setting is set to ON.

An EVF/LCD automatic switching 82 is a setting menu for automatically performing an operation of switching the image display between the electronic viewfinder (EVF) 12 and the rear display 11 (the liquid crystal display (LCD) 22) in accordance with the detection result of the detection unit 13. In a case in which the switching is automatically performed, this setting is set to ON. Accordingly, the switching between the electronic viewfinder 12 and the rear display 11 can be exclusively controlled automatically, which is effective for reducing the power consumption. When this setting is set to OFF, the electronic viewfinder 12 and the rear display 11 are manually switched. The manual switching method is arbitrary, but for example, the electronic viewfinder 12 and the rear display 11 can be selected in a toggle manner by manipulating the down button of the manipulation button 33. Further, a mode in which both the electronic viewfinder 12 and the rear display 11 are turned on and a mode in which both the electronic viewfinder 12 and the rear display 11 are turned off may be added.

A touch panel effective area setting 83 is a menu for enabling the user to set the effective detection area of the touch panel when the EVF is used as illustrated in FIG. 7. When this menu is touched and selected, the screen illustrated in FIG. 7 is displayed, and the user can perform a manipulation of changing the effective detection area. As an initial setting (default setting) of the effective detection area when the EVF is used, an area reduced to the upper right corner of the rear display with a predetermined size is set. Alternatively, as the initial setting of the effective detection area, the entire area of the rear display may be set, and the user may change it by the menu selection of the panel effective area setting 83.

A focus area size setting 84 is a menu for changing the size of the focus area (the focus frame). Accordingly, the size of the area to be focused on is changed and set in accordance with the size of the subject or the like.

An AF area reset 85 at the time of aspect change is a menu related to a setting of the focus area associated with a change in a posture at the time of photographing (lateral photographing state/longitudinal photographing state). The AF area reset 85 at the time of aspect change is a menu for setting whether or not the focus area is reset when the lateral photographing in which the imaging device is held laterally is changed to the longitudinal photographing in which the imaging device is held longitudinally at the time of photographing or when the longitudinal photographing is changed to the lateral photographing. Further, an AF area initial setting 86 at the time of aspect change is a setting related to an initial value at the time of resetting. These functions will be described in a second embodiment.

In the above description, the focus area is set to the position on which the user performs the touch manipulation, but the setting position may be changed further by a flick manipulation. The flick manipulation is a manipulation of quickly sweeping a finger in a predetermined direction in a touched state after touching. In this case, it is preferable to cause the focus setting area to be moved in the direction of the flick manipulation and cause the focus frame indicating the focus area after the movement to be displayed on the screen.

Further, in the above description, the position of the focus area in the screen set by the touch manipulation by the user is held without change, but the position of the focus area in the screen set by the touch manipulation by the user may be caused to further follow a motion of the subject. In other words, if the focus area is set in a desired subject, an image of the subject is recognized, and even when the subject moves within the screen, the focus area is caused to move and follow. Accordingly, it is possible to cause a moving subject to be focused on reliably.

According to the present embodiment, when the image is monitored with the electronic viewfinder 12, the effective detection area of the touch panel 21 is reduced and set, and thus even when the rear display 11 including the touch panel 21 installed therein has a large screen, the manipulation of the user for setting the focus area becomes easy. As a result, the user can quickly perform the focus positioning and the cooperative manipulation with the shutter button, and the usability is greatly improved.

Second Embodiment

In a case in which the longitudinal photographing in which the imaging device such as the digital camera is held vertically (longitudinally) is performed after the photographing (lateral photographing) is performed in a state in which the imaging device is held horizontally (laterally), the user usually moves the position of the subject in the screen to change framing, and thus the focus area deviates from a desired position. In other words, it is because, in the first embodiment, the position of the focus area in the screen which is once set is held without change, and the state of the lateral photographing is held without change. In this regard, in the present embodiment, a function of detecting the change in the photographing posture from the lateral photographing to the longitudinal photographing or from the longitudinal photographing to the lateral photographing, resetting the set focus area, and further automatically setting the focus area to a predetermined position for the lateral photographing or the longitudinal photographing is added.

The posture detection of whether the photographing posture is the lateral photographing state or the longitudinal photographing state can be performed using a geomagnetic sensor, a gyro sensor, an angular velocity sensor, or the like which can be easily installed in the imaging device.

In this function, the AF area reset 85 at the time of aspect change and the AF area initial setting 86 at the time of aspect change in the setting menu described in FIG. 8 are used. If the AF area reset 85 at the time of aspect change is set to ON, when the posture changes from the lateral photographing to the longitudinal photographing or from the longitudinal photographing to the lateral photographing, the change of the lateral photographing/longitudinal photographing is automatically detected, the currently set focus area is reset, and the initial value is set again. In the AF area initial setting 86 at the time of aspect change, the initial value of the focus area to be set again is set after resetting. As the initial setting, it is common to set the focus area to the center of the screen, but arbitrary different initial values may be set between the lateral photographing and the longitudinal photographing.

FIG. 9 illustrates an example of setting the focus area when the lateral photographing/longitudinal photographing is changed, and FIG. 9(a) illustrates an example of performing photographing in the lateral photographing state, and FIG. 9(b) illustrates an example of changing to the longitudinal photographing state. Here, the example of the display screen 50 of the electronic viewfinder 12 is illustrated, but the example of the display screen 40 of the rear display 11 is quite similar.

In the display screen 50 in the lateral photographing state of FIG. 9(a), the focus frame 53 (coordinates (X1, Y1)) is indicated at the position of the subject 51. Then, when the imaging device is rotated counterclockwise by 90° and changed to the longitudinal photographing state of FIG. 9(b), in a display screen 50', the focus frame 53 set in FIG. 9(a) is set at a position of 53' (coordinates (X1, Y1 indicated by a broken line) and deviates from the subject 51.

In this regard, in the present embodiment, the AF area reset 85 at the time of aspect change is set to ON, and an initial value (X2, Y2) of the focus area at the time of longitudinal photographing is set to a position indicated by a focus frame 55 by the AF area initial setting 86 at the time of aspect change. A position of the initial value (X2, Y2) is, for example, near the center of the upper part of the screen. This is because, in the case of photographing a person in, for example, the longitudinal photographing, the subject 51 is often positioned near the center of the upper part of the screen. Thus, when the photographing posture is changed from the lateral photographing to the longitudinal photographing, the focus area set at the time of lateral photographing is reset and automatically switched and set to the position of the initial value (X2, Y2) of the focus area at the time of longitudinal photographing, and thus the convenience for the user is improved. Alternatively, even when it is necessary for the user to correct the focus area with the touch manipulation, the focus area can be expected to be corrected with a small correction amount.

Third Embodiment

According to the first and second embodiments, the focus frame indicating the focus area is displayed on the display screen of the subject after the touch manipulation of the user on the touch panel is performed. In a case in which the display unit is integrated with the touch panel 21 as in the rear display 11, the user can instantaneously set the focus area to a desired subject position. However, in a case in which the display unit is the electronic viewfinder 12, the display unit is separated from the touch panel 21, and the display unit and the electronic viewfinder 12 are different in the screen size (the touch panel is the reduced effective detection area 60), and thus it is expected to be difficult for the user to instantaneously set the focus area to a desired subject position. In this regard, in the present embodiment, in order to assist the user to perform a task of setting the focus area, a position to which the focus area is settable is displayed on the display screen of the subject in advance as a focus candidate frame.

Figure 10:
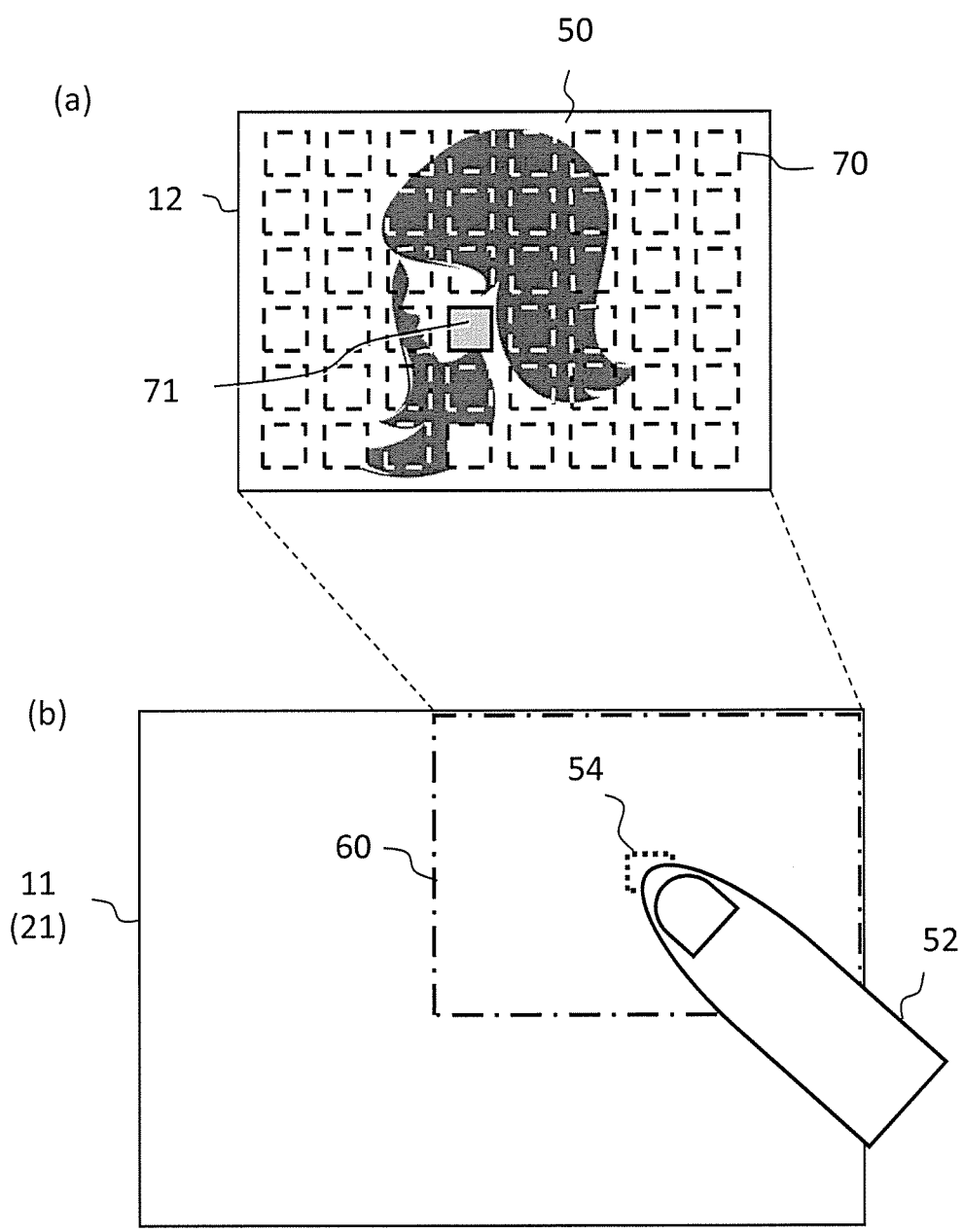
FIG. 10 is an explanatory diagram of a method of setting a focus area using a focus candidate frame (a third embodiment).

FIG. 10 is a diagram for describing a method of setting the focus area in a third embodiment. FIG. 10(a) illustrates the display screen 50 of the electronic viewfinder 12, and FIG. 10(b) illustrates a touch surface of the touch panel 21 installed in the rear display 11. A detectable area of touch panel 21 is reduced to the effective detection area 60.

As illustrated in FIG. 10(a), in the display screen 50 of the electronic viewfinder 12, a frame (candidate frame 70) indicating a candidate area is displayed at a position to which a focus area is settable in advance. In this example, a plurality of rectangular candidate frames 70 are arranged on the display screen 50 in a matrix form, and frame lines indicating the candidates are displayed with dotted lines.

On the other hand, as illustrated in FIG. 10(b), the user touches a desired position in the effective detection area 60 of the touch panel 21 with a finger 62 and designates the focus position 54. In this case, in the display screen 50 of FIG. 10(a), the position corresponding to the focus position 54 touched from the candidate frame 70 is selected and set as the focus area, and a setting frame 71 of a solid line indicating that it has been set is displayed. Accordingly, the user can easily check the setting position of the focus area by the setting frame 71 of the solid line.

If this position of the setting frame 71 which is once set as the focus area is touched once again, the setting of the focus area is canceled, and the process returns to the candidate frame 70, and the user can change the setting of the focus area. In this example, the frame line of the candidate frame 70 is indicated by a dotted line, and the frame line of the setting frame 71 is indicated by a solid line, but the display forms thereof are arbitrary as long as they can be easily distinguished.

According to the present embodiment, since the candidate position of the focus area is displayed in advance, the user can set the focus position on the basis of the candidate, and the setting task can be performed at a high speed. In the above example, the image is displayed on the electronic viewfinder 12, but the present invention can be applied even when the image is displayed on the rear display 11 integrated with the touch panel, and there is an effect in that the setting task of the user is assisted by displaying the candidate position of the focus area in advance.

Fourth Embodiment

Figure 11:
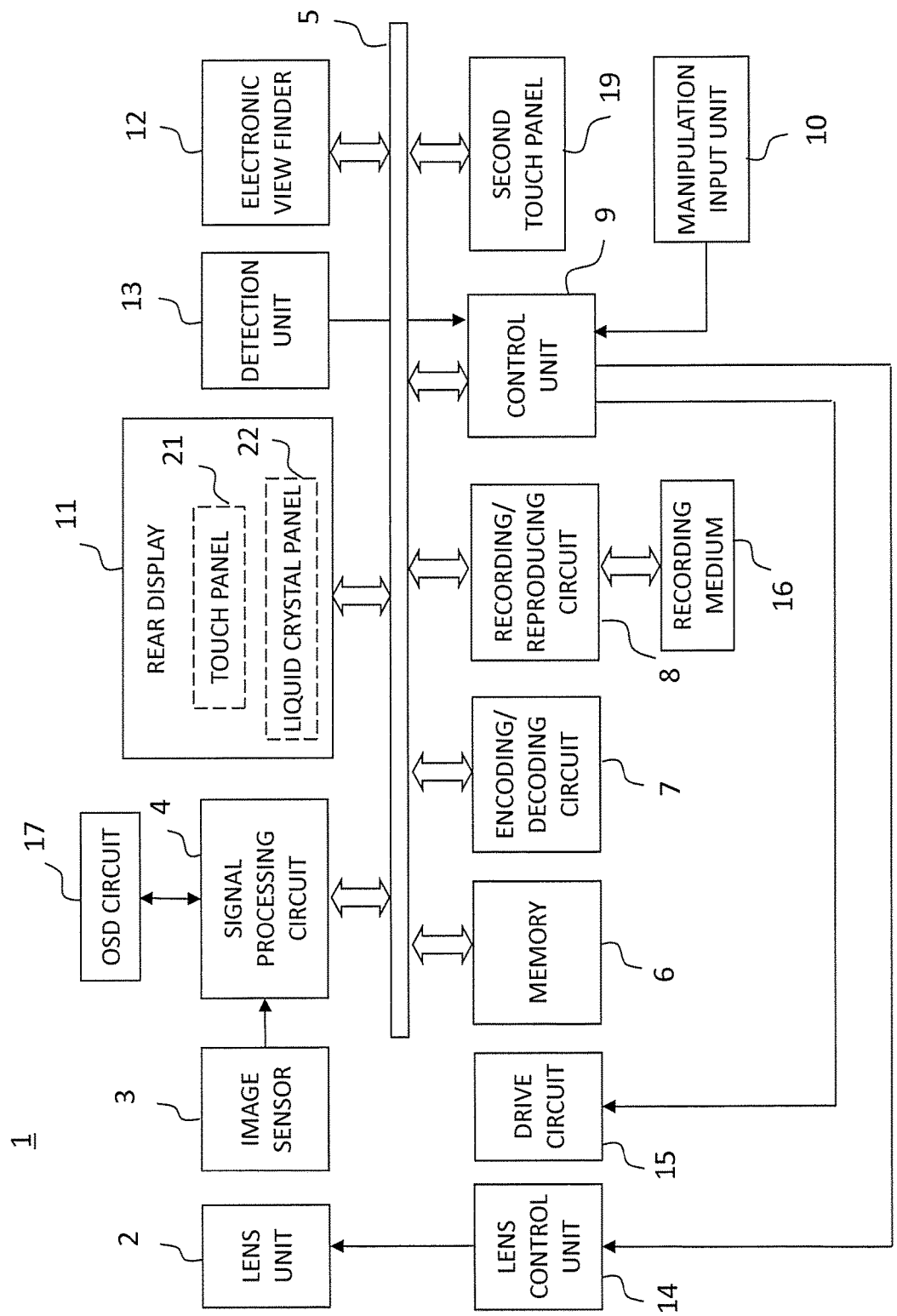
FIG. 11 is a block diagram illustrating a configuration of an imaging device according to a fourth embodiment.

FIG. 11 is a block diagram illustrating a configuration of an imaging device according to a fourth embodiment. An imaging device 1 of the present embodiment includes two display units, that is, a rear display 11 and an electronic viewfinder 12, similarly to the first embodiment (FIG. 1), and the rear display 11 has a structure in which a touch panel 21 is integrated with a liquid crystal panel 22. The fourth embodiment differs from the first embodiment in that a dedicated touch panel 19 corresponding to the electronic viewfinder 12 is installed. Hereinafter, the touch panel 21 installed in rear display 11 is referred to as a "first touch panel," and the touch panel 19 dedicated to the electronic viewfinder 12 is referred to as a "second touch panel." Differences from the first embodiment (FIG. 1) will be described.

The rear display 11 has a configuration in which the first touch panel 21 is integrated with the liquid crystal panel 22, and the first touch panel 21 functions to receive a touch manipulation on an image displayed on the liquid crystal panel 22. The electronic viewfinder 12 is a display for viewing an image to be captured, and the second touch panel 19 is a dedicated touch panel used for receiving a manipulation when the electronic viewfinder 12 is used. The user performs monitoring at the time of photographing, checking of the reproduced image, and the like using either the rear display 11 or the electronic viewfinder 12. Commonly, any one of display units is preferably used, and the display unit is automatically switched on the basis of a detection result of a detection unit 13.

The rear display 11 and the first touch panel 21 have structures similar to those described in the first embodiment (FIG. 2). The second touch panel 19 has a structure similar to that of the first touch panel 21 and detects a position which the finger of the user or the touch pen touches or approaches. However, unlike the case of the rear display 11, a liquid crystal panel is not installed. In other words, it is configured with the touch panel and a protective cover thereof excluding the liquid crystal panel 22 and the backlight 23 from the configuration of the rear display 11 illustrated in FIG. 2.

FIG. 12 is an external diagram illustrating an imaging device according to a fourth embodiment, and FIG. 12(a) is a diagram of the imaging device viewed from the rear surface, and FIG. 12(b) is a diagram of the imaging device viewed from the right side. The second touch panel 19 added to the configuration of the first embodiment (FIG. 3) is used for receiving the touch manipulation when the electronic viewfinder 12 is used. The second touch panel 19 is arranged on the right side of the rear display 11 and smaller in size than the rear display 11.

In a case in which the electronic viewfinder 12 is used, the user can manipulate the shutter button 32 with, for example, the right index finger or manipulate the second touch panel 19 installed on the right side of the rear display 11 with the right thumb while looking into the electronic viewfinder 12.

Next, an operation of setting the focus area by the touch panel manipulation which is one of the features of the present embodiment will be described. The setting of the focus area may be performed while viewing the rear display 11 and may be performed while viewing the electronic viewfinder 12. In a case in which the focus area is set while viewing the rear display 11, it is similar to that in the first embodiment (FIG. 4), and the touch manipulation is performed on the first touch panel 21 installed on the rear display 11 with the finger. On the other hand, when the focus area is set while viewing the electronic viewfinder 12, the touch manipulation on the second touch panel 19 dedicated to the use of the electronic viewfinder is performed with the finger.

FIG. 13 is a diagram for describing a method of setting the focus area on the display image of the electronic viewfinder 12 in the second touch panel 19. A relation between the display screen 50 of the electronic viewfinder 12 and the touch surface of the second touch panel 19 is illustrated. As illustrated in FIG. 12, the screen size of the electronic viewfinder 12 is generally smaller than the screen size of the rear display 11, and the electronic viewfinder 12 and the second touch panel 19 are arranged to deviate in the left and right direction.

If the user looks into the electronic viewfinder 12, the detection unit 13 detects that the face of the user approaches the electronic viewfinder 12, the control unit 9 causes the video signal to be output to the electronic viewfinder 12, causes the video output to the rear display 11 to be output, and stops the detection operation of the panel. Further, the backlight 23 of the rear display 11 is turned off to reduce the power consumption. On the other hand, the operation of the second touch panel 19 is enabled, and the focus area is set for the image displayed on the electronic viewfinder 12 using this.

The subject 51 is displayed on the display screen 50 of the electronic viewfinder 12. On the other hand, in a case in which the manipulation of setting the focus area is performed while looking into the electronic viewfinder 12, in general, the user often manipulates the focus position with a right hand thumb 52 and manipulates the shutter button with an index finger while supporting the body of the camera with the left hand and gripping the grip part of the body with the right hand. As the second touch panel 19 is arranged on the right side of the imaging device as in the present embodiment, it is easy to manipulate the second touch panel 19 with the right hand thumb 52 even when the device has a large size. In other words, the user can perform the touch manipulation to a desired position in the second touch panel 19 without separating the right hand from the body.

For example, the user manipulates the right hand thumb 52 and touches the focus position 54 in the second touch panel 19. The control unit 9 sets the focus area to the position in the display screen 50 of the electronic viewfinder 12 corresponding thereto (the display position of the subject 51 in this example), and causes the focus frame 53 indicating the focus area to be displayed. As a result, it is possible to promptly perform the focus positioning and the cooperative manipulation with the shutter button, and the usability is greatly improved.

As described above, in the present embodiment, the first touch panel 21 integrated with the rear display 11 and the second touch panel 19 dedicated to the electronic viewfinder 12 are exclusively switched between when the image is displayed on the rear display 11 and when the image is displayed on the electronic viewfinder 12 and used. Accordingly, even when the rear display 11 is increased in size, the operability of the user does not deteriorate, and the usability can be improved. Further, the grip portion may be installed on the right side of the body rear surface so that the imaging device 1 can be easily held with hand, and at that time, the second touch panel may be arranged in the grip portion.

FIG. 14 is a diagram illustrating a display example of the menu screen associated with the focus operation. Items added to the first embodiment (FIG. 8) will be described. In the menu screen 80, a main touch panel 87 is a setting menu for turning on or off the operation of the first touch panel 21 integrated with the rear display 11. Further, a sub touch panel 88 is a setting menu for turning on or off the operation of the second touch panel 19 dedicated to the electronic viewfinder 12. The ON/OFF switching between the main touch panel 87 and the sub touch panel 88 may be interlocked with the EVF/LCD automatic switching 82.

According to the present embodiment, in a case in which the image is monitored by the electronic viewfinder 12, the focus area can be set using the dedicated second touch panel 19, and the manipulation of the user for setting the focus area becomes easy. As a result, it is possible to promptly perform the focus positioning and the cooperative manipulation with the shutter button, and the usability is greatly improved.

Fifth Embodiment

In a fifth embodiment, a liquid crystal panel is added to the second touch panel in the fourth embodiment to form a second rear display.

FIG. 15 is a block diagram illustrating a configuration of the imaging device according to the fifth embodiment. A first rear display 91 corresponds to the rear display 11 in the fourth embodiment (FIG. 11), and a first touch panel 21a is integrated with a first liquid crystal panel 22a. Further, in a second rear display 92, a second touch panel 21b is integrated with a second liquid crystal panel 22b. A second rear display 92 has a smaller screen size than a first rear display 91, but an internal configuration thereof is similar. The second rear display 92 enables the user to perform the touch manipulation, and an image other than the subject is displayed on the second liquid crystal panel 22b as will described later. The remaining components and operations are similar as those in the fourth embodiment, and detailed description thereof is omitted.

FIG. 16 is an external diagram illustrating an imaging device according to the fifth embodiment, which is a diagram of the imaging device viewed from the rear surface. A diagram viewed from the side is similar to FIG. 12(b). The second rear display 92 is arranged on the right side of the rear surface of the imaging device 1, that is, on the right side of the first rear display 91. In this example, the second rear display 92 is disposed on the lower right side of the rear surface, but it may be arranged on the upper right side. The second rear display 92 is arranged on the right side of the imaging device 1 as described above, and thus, when the user supports the imaging device with the right hand, it is possible to easily manipulate the second touch panel 21b in the second rear display 92 with the right thumb.

Figure 17A:
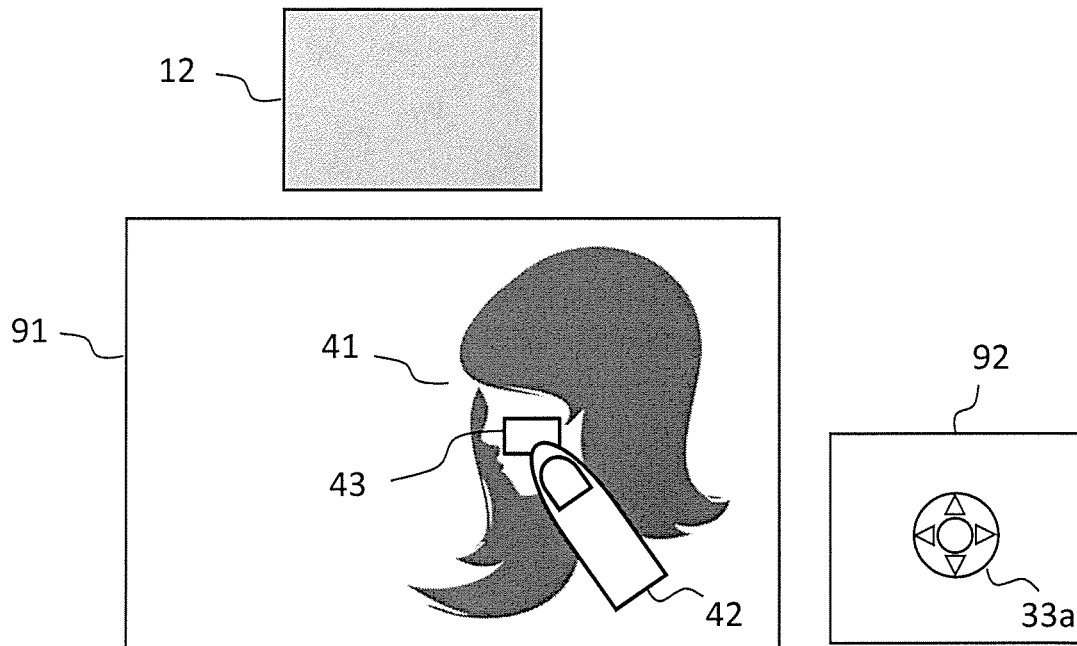
FIG. 17A is a diagram illustrating an example of images displayed on an electronic viewfinder and first and second rear displays.
Figure 17B:
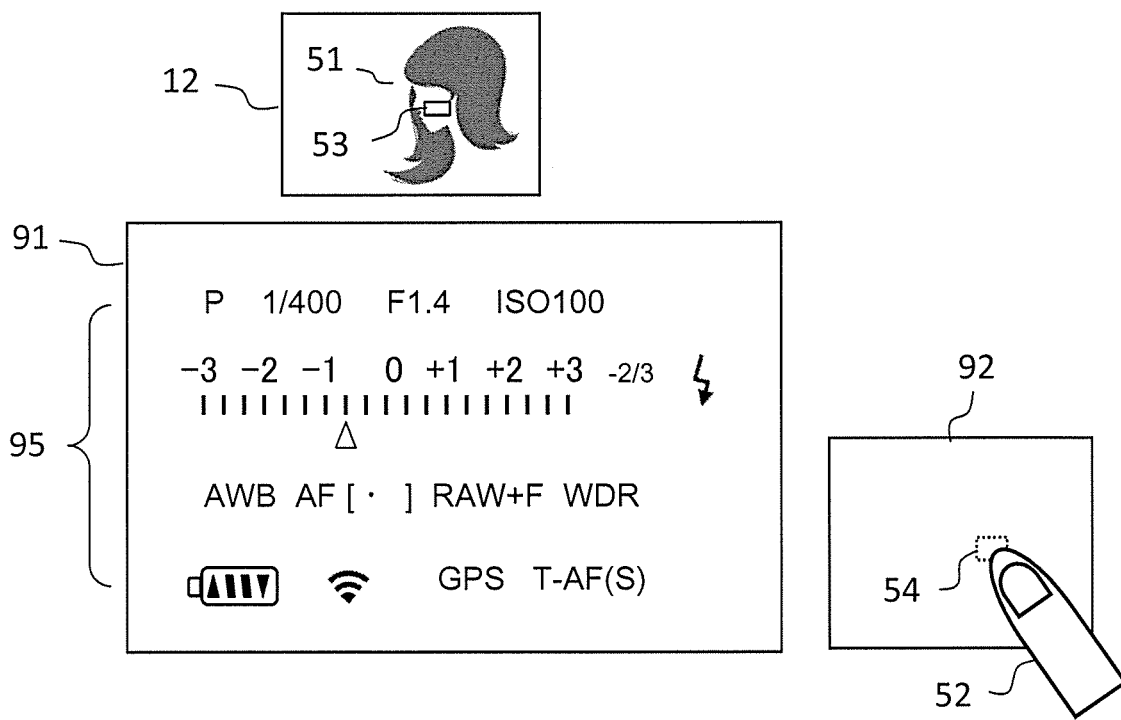
FIG. 17B is a diagram illustrating an example of images displayed on an electronic viewfinder and first and second rear displays.

FIGS. 17A and 17B are diagrams illustrating examples of images displayed on the electronic viewfinder 12, the first rear display 91 and the second rear display 92 when the photographing is performed.

FIG. 17A illustrates an example in which the subject is displayed using the first rear display 91. An image of the subject 41 being captured is displayed on the first rear display 91, and the display of the electronic viewfinder 12 is stopped. The user can set the focus frame 43 to the subject 41 by performing the touch manipulation on the display screen of the first rear display 91 with the finger 42.

At this time, for example, a manipulation button 33a is displayed on the second rear display 92. The manipulation button 33a corresponds to the manipulation button 33 in FIG. 12, and in FIG. 12, the manipulation button 33a is constituted by hardware, but the manipulation button 33a here is displayed as an image. When the touch manipulation is performed on the manipulation button 33a, similar functions (the display and the selection of the menu screen) to those of the manipulation button 33 in FIG. 12 are performed.

FIG. 17B illustrates an example in which the subject is displayed using the electronic viewfinder 12. The electronic viewfinder 12 displays the image of the subject 51 being captured, and the second rear display 92 stops the image display and receives the touch manipulation of the user. Then, the focus frame 53 is set for the subject 51 in the electronic viewfinder 12 in response to the touch manipulation (the focus position 54) of the finger 52, On the other hand, various kinds of information 95 related to the photographing are displayed on the first rear display 91. The information 95 includes settings relating to the photographing such as the shutter speed, the aperture value, and the ISO sensitivity. As the information is displayed, the user can easily check various kinds of settings at the time of photographing. In the case of the setting in which the display of the first rear display 91 and the display the electronic viewfinder 12 are automatically switched, the display of the first rear display 91 may be stopped when the electronic viewfinder 12 is used.

In the present embodiment, the manipulation button 33a is displayed on the second rear display 92 when the first rear display 91 is used, so that the user can input a manipulation. Accordingly, the second touch panel 19 and the manipulation button 33 in the fourth embodiment (FIG. 12 (a)) can be used together and the configuration of the imaging device can be streamlined.

Sixth Embodiment

In a sixth embodiment, a multi rear display 100 that displays a plurality of images simultaneously is constituted such that a first rear display 91 and a second rear display 92 in the fifth embodiment are integrated.

Figure 18:
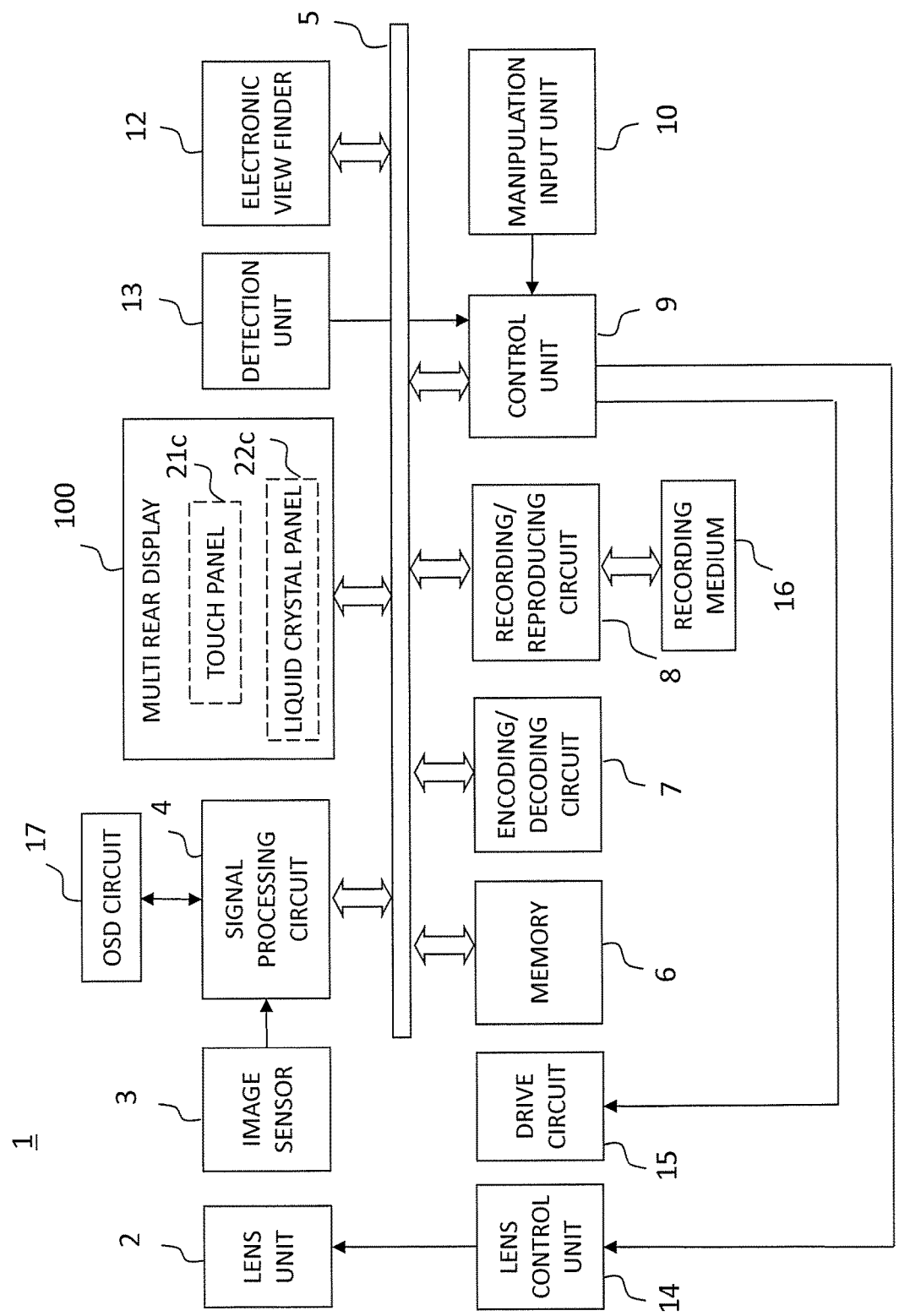
FIG. 18 is a block diagram illustrating a configuration of an imaging device according to a sixth embodiment.

FIG. 18 is a block diagram illustrating a configuration of an imaging device according to the sixth embodiment. The multi rear display 100 is constituted such that the first rear display 91 and the second rear display 92 in the fifth embodiment (FIG. 15) are integrated, and includes a common touch panel 21c and a liquid crystal panel 22c. The remaining components and operations are similar to those in the fifth embodiment, and detailed description thereof is omitted.

Figure 19:
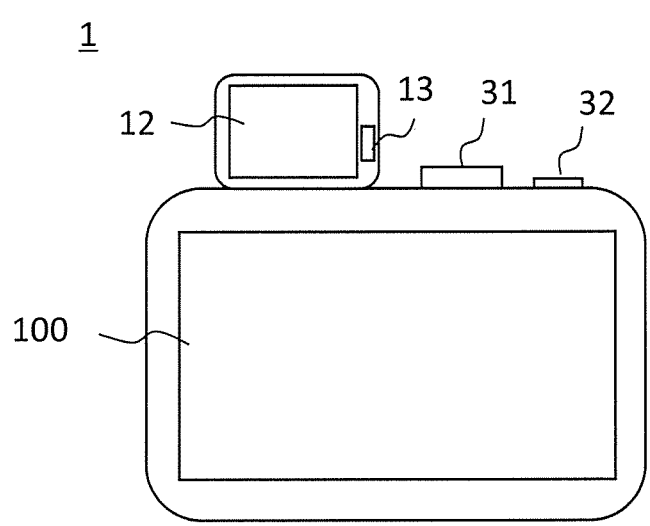
FIG. 19 is an external diagram illustrating an imaging device according to the sixth embodiment.

FIG. 19 is an external diagram illustrating an imaging device according to the sixth embodiment, which is a diagram of the imaging device viewed from the rear surface. A diagram viewed from the side is similar to FIG. 12(*b*). A single multi rear display 100 is arranged on the rear surface, and the screen size for displaying a plurality of images at the same time is increased.

Figure 20A:
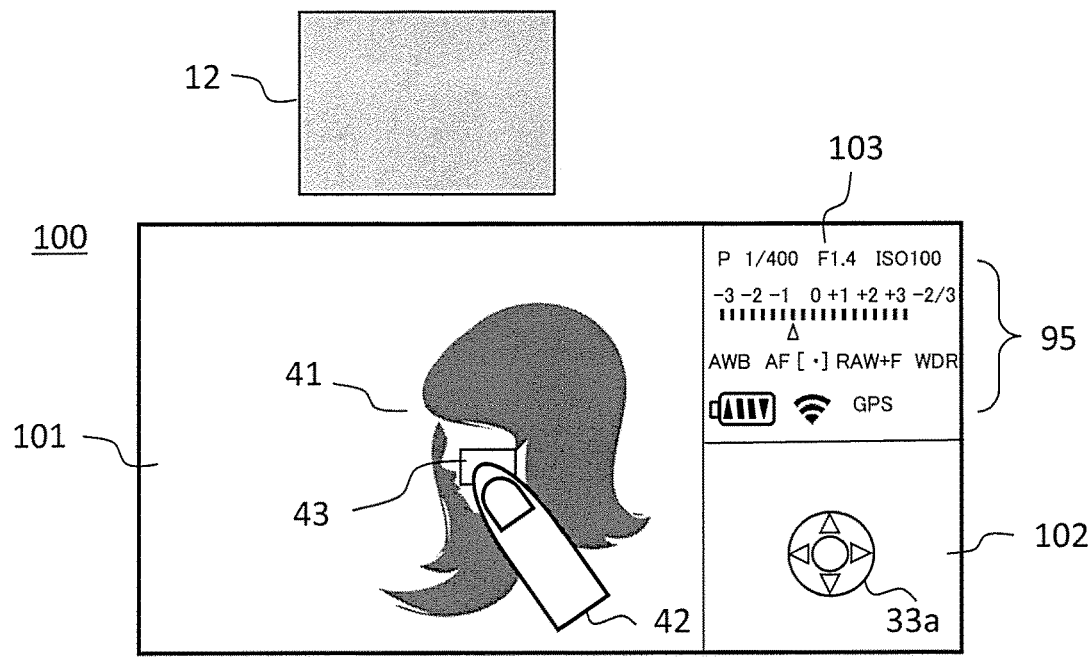
FIG. 20A is a diagram illustrating an example of images displayed on an electronic viewfinder and a multi rear display.
Figure 20B:
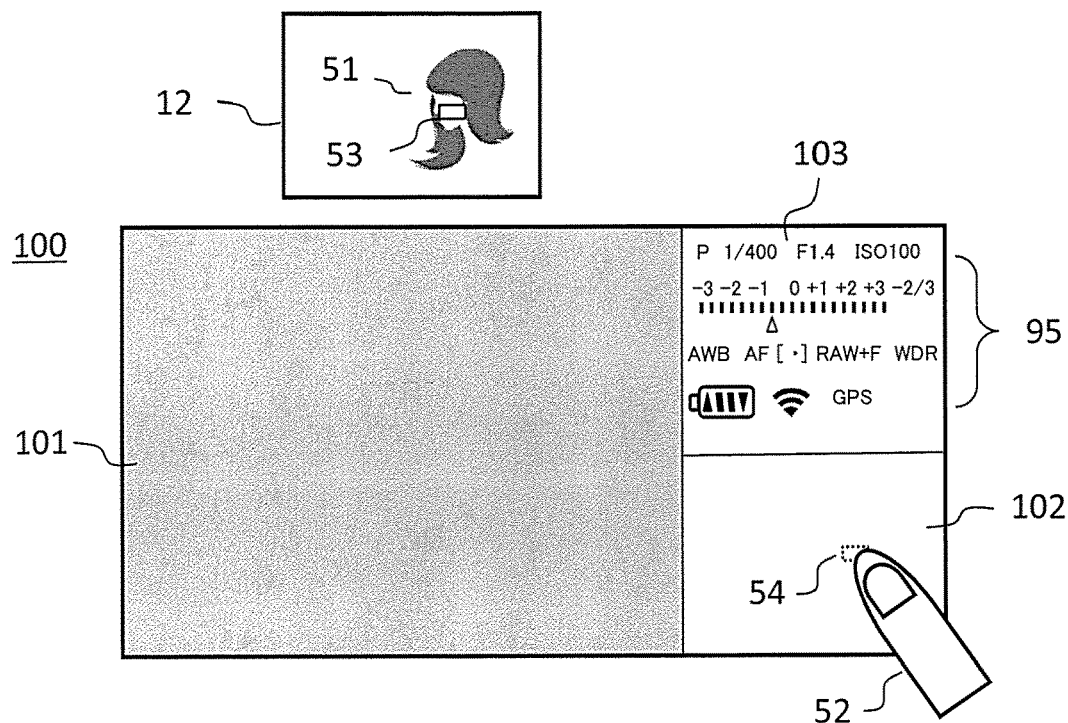
FIG. 20B is a diagram illustrating an example of images displayed on an electronic viewfinder and a multi rear display.

FIGS. 20A and 20B are diagrams illustrating examples of images displayed on the electronic viewfinder 12 and the multi rear display 100 when the photographing is performed.

FIG. 20A illustrates an example in which the subject is displayed using the multi rear display 100. When the multi rear display 100 is used, the screen is divided into three areas 101, 102, and 103 and displayed. The first area 101 on the left side corresponds to the first rear display 91 in the fifth embodiment, and an image such as the subject 41 is displayed so that the touch manipulation of the user is received. The second area 102 on the lower right side corresponds to the second rear display in the fifth embodiment, and displays, for example, the manipulation button 33*a*. Further, shooting information 95 described by the fifth embodiment (FIG. 17B) is displayed on the third area 103 on the upper right side. Accordingly, it is possible to easily check the setting related to the photographing such as the shutter speed, the aperture value, and the like while displaying the subject image on the multi rear display 100.

FIG. 20B illustrates an example the subject is displayed using the electronic viewfinder 12. In this case, the image display on the first area 101 of the multi rear display 100 is stopped, and the touch manipulation of the user on the display image in the electronic viewfinder 12 is received in the second area 102. Further, the shooting information 95 is displayed in the third area 103.

The split screen display of the multi rear display 100 illustrated in FIGS. 20A and 20B is an example, and the image display or the touch manipulation input may be performed in accordance with any other arbitrary combination.

In the present embodiment, the display content of the split area and the manipulation content of each split area of the multi rear display are switched between when the subject image is displayed on the multi rear display using the multi rear display that simultaneously displays a plurality of images on the split screen and when the subject image is displayed on the electronic viewfinder. Accordingly, the configuration of the imaging device can be further streamlined.

In each of the above embodiments, the setting of the focus area has been described as the manipulation using the touch panel, but the touch manipulation input is not limited to this example, and the touch manipulation input may be used in an area setting of exposure control, an area setting on a screen in a case in which the focus and the exposure control are performed at the same time, or the like. Further, it can be applied to when a target of subject recognition or person recognition is set or a setting input of the photographing conditions such as the shutter speed, the aperture value, and the ISO sensitivity.

The embodiments of the present invention have been described above, but the present invention is not limited to the above embodiments but includes various modified examples. For example, the above embodiments have been described in detail in order to facilitate understanding of the present invention and are not necessarily limited to those having all the components described above. Further, it is possible to replace a part of a configuration of an embodiment with a configuration of another embodiment, and it is also possible to add a configuration of another embodiment to a configuration of an embodiment. It is also possible to perform addition, deletion, and replacement of configurations of other embodiments on a part of the configurations of each embodiment.

REFERENCE SIGNS LIST

1 imaging device
2 lens unit
3 image sensor
4 signal processing circuit
7 encoding/decoding circuit
8 recording/reproducing circuit
9 control unit
10 manipulation input unit
11, 91, 92 rear display
12 electronic viewfinder
13 detection unit
14 lens control unit
15 drive circuit
16 recording medium
17 OSD circuit
19, 21, 21*a* to 21*c* touch panel
22, 22*a* to 22*c* liquid crystal panel
31 mode setting dial
32 shutter button
33, 33*a* manipulation button
40 display screen of rear display
41, 51 subject image
42, 52 finger of user
43, 53, 55, 71 focus frame (focus position)
50 display screen of electronic viewfinder
60, 61 effective detection area of touch panel
70 candidate frame of focus area
80 menu screen
95 shooting information
100 multi rear display
101 to 103 split area

The invention claimed is:

1. An imaging device that enables to set a focus area in which an image of a subject is focused on, the imaging device comprising:
   an image sensor that receives an optical image through a focus lens and converts the optical image into an output signal;
   a lens controller that controls a position of the focus lens such that a focus operation is performed on set focus area;
   a signal processing circuit that generates a video signal from an output signal of the image sensor;
   a first display that displays an image of the subject using the video signal from the signal processing circuit;
   a second display that displays the image of the subject using the video signal from the signal processing circuit;
   a display converter that switches between the first display and the second display to display the image of the subject;
   a touch panel that detects touch manipulation; and
   a sensor that detects whether the imaging device is in a lateral imaging state or a longitudinal imaging state;
   wherein, when the image of the subject is displayed on the first display and when the image of the subject is displayed on the second display, an effective detection area, in which the touch manipulation on the touch panel is detected, is differently settable,
   when a touch manipulation in the effective detection area of the touch panel is detected while an image of the subject is displayed on the first display or the second display, for the image of the subject, a focus area corresponding to the position of the detected touch manipulation in the effective detection area is set, and a focus frame indicating the set focus area is superimposedly displayed, and when the imaging device is changed from the lateral imaging state to the longitudinal imaging state, the focus area is changed from a first focus area set corresponding to the position of the touch manipulation in the lateral imaging state to a second focus area preset by the user in the longitudinal imaging state.

2. The imaging device according to claim 1, wherein in response to the change from the lateral imaging state to the longitudinal imaging state, the focus frame indicating the focus area in the longitudinal imaging state on the image of the subject is superimposedly displayed.

3. The imaging device according to claim 1, wherein the focus area in the longitudinal imaging state is settable arbitrarily.

4. The imaging device according to claim 1, wherein the effective detection area of the touch panel is set by the user.

5. The imaging device according to claim 1, wherein in response to the change from the lateral imaging state to the longitudinal imaging state, the focus area set corresponding to the position of the touch manipulation in the lateral imaging state is reset.

6. The imaging device according to claim 1, wherein the focus area preset by the user in the longitudinal imaging state is set as an initial value.

7. The imaging device according to claim 1,
wherein the first display is a rear display arranged on a rear surface of the imaging device, and is configured integrally with the touch panel,
wherein the second display is an electronic viewfinder arranged on an upper part of the imaging device, and
wherein the effective detection area of the touch panel is set to coincide with an entire display screen when the image is displayed on the rear display and is settable to be reduced to an area of a part of the display screen of the rear display when the image is displayed on the electronic viewfinder.

8. The imaging device according to claim 7, further comprising a detector that detects an approach of an object to the electronic viewfinder,
wherein the display converter causes the image of the subject to be displayed on the electronic viewfinder when the approach of the object to the electronic viewfinder is detected on the basis of a detection result of the detector, and causes the image of the subject to be displayed on the rear display when the approach of the object to the electronic viewfinder is not detected.

9. The imaging device according to claim 7, wherein when the image is displayed on the electronic viewfinder, the effective detection area set in the touch panel is changeable by a drag manipulation of the user on the touch panel.

10. An imaging device that enables a user to set a focus area in which an image of a subject is focused on, the imaging device comprising:
an imager that acquires the image of a subject using an optical image from a focus lens;
a first display that displays the image of a subject acquired by the imager;
a second display that displays the image of a subject acquired by the imager;
a touch panel that detects touch manipulation;
a sensor that detects whether the imaging device is in a lateral imaging state or a longitudinal imaging state; and
a controller configured to switch between the first display and the second display to display the image of the subject;
wherein an effective detection area, in which the touch manipulation on the touch panel is detected, is differently settable when the image of the subject is displayed on the first display and when the image of the subject is displayed on the second display,
wherein
when the imaging device is in the lateral imaging state, the image of the subject is displayed on the first display, and the touch manipulation in the effective detection area of the touch panel is detected,
the controller, for the image of the subject displayed on the first display, controls a focus area to be set, the focus area corresponding to the position of the detected touch manipulation in the effective detection area, and controls a focus frame indicating set focus area to be superimposedly displayed, and
when the sensor detects a change from the lateral imaging state to the longitudinal imaging state, the controller controls the focus area to be changed from a first focus area set corresponding to the position of the touch manipulation in the lateral imaging state to a second focus area preset by the user in the longitudinal imaging state.

11. The imaging device according to claim 10, wherein in response to the change from the lateral imaging state to the longitudinal imaging state, the controller controls the first display to superimposedly display the focus frame indicating the focus area in the longitudinal imaging state on the image of the subject.

12. The imaging device according to claim 10, wherein the focus area in the longitudinal imaging state is settable arbitrarily.

13. The imaging device according to claim 10, wherein the effective detection area of the touch panel is set by the user.

14. The imaging device according to claim 10, wherein in response to the change from the lateral imaging state to the longitudinal imaging state, the controller controls the focus area set corresponding to the position of the touch manipulation in the lateral imaging state to be reset.

15. The imaging device according to claim 10, wherein the focus area preset by the user in the longitudinal imaging state is set as an initial value.

16. The imaging device according to claim 10,
wherein the first display is a rear display arranged on a rear surface of the imaging device, and is configured integrally with the touch panel,
wherein the second display is an electronic viewfinder arranged on an upper part of the imaging device, and
wherein the effective detection area of the touch panel is set to coincide with an entire display screen when the image is displayed on the rear display and is settable to be reduced to an area of a part of the display screen of the rear display when the image is displayed on the electronic viewfinder.

17. The imaging device according to claim 16, further comprising a detector that detects an approach of an object to the electronic viewfinder,
wherein the controller controls the image of the subject to be displayed on the electronic viewfinder when the approach of the object to the electronic viewfinder is detected on the basis of a detection result of the detector, and controls the image of the subject to be displayed on the rear display when the approach of the object to the electronic viewfinder is not detected.

18. The imaging device according to claim 16, wherein when the image is displayed on the electronic viewfinder, the effective detection area set in the touch panel is changeable by a drag manipulation of the user on the touch panel.

* * * * *